United States Patent
Anderson

(10) Patent No.: US 11,349,289 B2
(45) Date of Patent: May 31, 2022

(54) MOUNTING BRACKET FOR ELECTRICAL BOXES

(71) Applicant: ERICO International Corporation, Solon, OH (US)

(72) Inventor: Scott Ernest Anderson, Garrettsville, OH (US)

(73) Assignee: ERICO International Corporation, Solon, OH (US)

( * ) Notice: Subject to any disclaimer, the term of this patent is extended or adjusted under 35 U.S.C. 154(b) by 101 days.

(21) Appl. No.: 17/022,302

(22) Filed: Sep. 16, 2020

(65) Prior Publication Data
US 2021/0091551 A1 Mar. 25, 2021

Related U.S. Application Data

(60) Provisional application No. 62/902,663, filed on Sep. 19, 2019.

(51) Int. Cl.
*H02G 3/10* (2006.01)
*H02G 3/04* (2006.01)
*H02B 1/34* (2006.01)

(52) U.S. Cl.
CPC ............... *H02G 3/105* (2013.01); *H02B 1/34* (2013.01); *H02G 3/0437* (2013.01)

(58) Field of Classification Search
CPC .......... H02G 3/14; H02G 3/126; H02G 3/123; H02G 3/12; H02G 3/081; H02G 3/18; H02G 3/086; H02G 3/20; H02G 3/10; H02G 3/088; H02G 3/121; H02G 3/125; H02G 3/083; H02G 3/16; H02G 1/00; H02G 3/08; H02G 3/185; H02G 3/00;
(Continued)

(56) References Cited

U.S. PATENT DOCUMENTS 1,777,291 A 10/1930 Clayton
1,782,791 A * 11/1930 Nielsen .................. B65D 45/06
248/343
(Continued)

FOREIGN PATENT DOCUMENTS

EP 1720227 B1 11/2006
WO 2008112285 A1 9/2008
(Continued)

OTHER PUBLICATIONS

NVent Caddy T-Grid Box Hanger, spec sheet, 1 page, Copyright 2020 nVent.
(Continued)

*Primary Examiner* — William H. Mayo, III
*Assistant Examiner* — Krystal Robinson
(74) *Attorney, Agent, or Firm* — Quarles & Brady LLP

(57) ABSTRACT

A bracket system for mounting an electrical box and other components can include a mounting bracket configured to be removably secured to a support bar or a threaded rod. The mounting bracket can include a plurality of spring arms that can be manually moved towards each other to insert locking profiles of the spring arms into one or more mounting openings of the electrical box. Once the locking profiles are inserted, the spring arms can be released so that they spring resiliently apart from each other and secure the locking profiles against removal from mounting openings.

20 Claims, 22 Drawing Sheets

(58) Field of Classification Search
CPC .......... H02G 3/22; H02G 3/085; H02G 3/128;
H02G 5/08; H02G 3/0493; H02G 3/105;
H02G 15/013; H02G 3/26; H02G 11/02;
H02G 15/117; H02G 9/10; H02G 15/076;
H02G 3/0691; H02G 3/32; H02G 3/04;
H02G 15/06; H02G 15/10; H02G 3/0487;
H02G 1/14; H02G 3/0608; H02G 3/0616;
H02G 3/065; H02G 3/0683; H02G 3/288;
H02G 15/007; H02G 15/08; H02G
3/0418; H02G 3/0437; H02G 3/30; H02G
3/383; H02G 13/40; H02G 3/0431; H02G
3/0481; H02G 3/38; H02G 3/388; H02G
5/061; H02G 7/02; H02G 7/18; H02G
1/08; H02G 11/00; H02G 13/00; H02G
13/80; H02G 15/04; H02G 15/046; H02G
15/085; H02G 15/14; H02G 15/16; H02G
2200/30; H02G 3/02; H02G 3/0412;
H02G 3/0468; H02G 3/0625; H02G 3/24;
H02G 3/281; H02G 3/283; H02G 3/285;
H02G 3/286; H02G 5/00; H02G 5/007;
H02G 5/066; H02G 5/068; H02G 7/14;
H02G 9/04; F21V 21/02; H01L 23/645;
F16B 2/22
See application file for complete search history.

(56) References Cited

U.S. PATENT DOCUMENTS

| | | | |
|---|---|---|---|
| 1,798,838 A | | 3/1931 | Garvin |
| 1,891,541 A | * | 12/1932 | Howard ................. G08B 17/06 337/414 |
| 1,930,928 A | * | 10/1933 | Dunlap, Sr. ............. H05K 7/04 220/3.9 |
| 2,299,676 A | | 10/1942 | Austin, Jr. |
| 2,670,919 A | * | 3/1954 | Esoldi .................... F21V 21/02 248/57 |
| 2,854,205 A | | 9/1958 | Kurger |
| 2,939,669 A | | 6/1960 | Pascucci |
| 3,214,126 A | * | 10/1965 | Roos ...................... H02G 3/125 220/3.9 |
| 3,217,087 A | * | 11/1965 | Harrison ................. H01G 9/10 174/559 |
| 3,597,889 A | * | 8/1971 | Lo Nigro ............... H02G 3/125 248/57 |
| 3,912,865 A | | 10/1975 | Seebinger |
| 3,987,992 A | | 10/1976 | Foflygen |
| 4,041,657 A | * | 8/1977 | Schuplin ................ E04B 9/006 52/39 |
| 4,403,708 A | | 9/1983 | Smolik |
| 4,967,990 A | * | 11/1990 | Rinderer ................ H02G 3/125 220/3.9 |
| 5,009,383 A | | 4/1991 | Chapman |
| 5,435,514 A | * | 7/1995 | Kerr, Jr. ................. E04B 9/006 248/343 |
| 5,505,419 A | | 4/1996 | Gabrius |
| 5,516,068 A | | 5/1996 | Rice |
| 5,619,263 A | | 4/1997 | Laughlin et al. |
| 5,626,316 A | * | 5/1997 | Smigel ................... H02G 3/32 248/68.1 |
| 5,758,959 A | | 6/1998 | Sieczkowski |
| 5,857,766 A | | 1/1999 | Sieczkowski |
| 5,934,631 A | | 8/1999 | Becker et al. |
| 6,004,011 A | | 12/1999 | Sieczkowski |
| 6,033,098 A | * | 3/2000 | Hentz .................... F21V 21/04 362/147 |
| 6,332,597 B1 | * | 12/2001 | Korcz ................... H02G 3/125 248/200.1 |
| 6,345,800 B1 | | 2/2002 | Herst et al. |
| 6,461,016 B1 | | 10/2002 | Jamison et al. |
| 6,491,270 B1 | | 12/2002 | Pfaller |
| 6,595,479 B2 | | 7/2003 | Johnson et al. |
| 6,761,341 B2 | | 7/2004 | Pfaller |
| 6,889,943 B2 | | 5/2005 | Dinh et al. |
| 6,967,284 B1 | | 11/2005 | Gretz |
| 7,191,994 B2 | * | 3/2007 | Johnson ................. F04D 29/601 248/909 |
| 7,216,838 B1 | | 5/2007 | Gretz |
| 7,234,674 B2 | | 6/2007 | Rippel et al. |
| 7,240,884 B2 | | 7/2007 | Shim |
| 7,271,335 B2 | | 9/2007 | Dinh |
| 7,271,336 B2 | | 9/2007 | Dinh |
| 7,355,118 B1 | | 4/2008 | Gretz |
| 7,521,631 B2 | | 4/2009 | Dinh |
| 7,673,841 B2 | | 3/2010 | Wronski |
| 7,735,794 B1 | | 6/2010 | Gretz |
| 7,735,795 B2 | | 6/2010 | Wronski |
| 7,857,275 B2 | * | 12/2010 | de la Borbolla ....... H02G 3/125 248/342 |
| 7,874,539 B2 | | 1/2011 | Wright et al. |
| 8,038,113 B2 | | 10/2011 | Fryzek et al. |
| 8,087,631 B1 | | 1/2012 | Gretz |
| 8,091,721 B1 | * | 1/2012 | Gretz .................... H02G 3/125 248/200.1 |
| 8,240,630 B2 | | 8/2012 | Wronski |
| 8,403,277 B2 | * | 3/2013 | Nuernberger .......... H02G 3/125 248/200.1 |
| 8,616,513 B2 | | 12/2013 | Kerr, Jr. |
| 8,622,361 B2 | | 1/2014 | Wronski |
| 8,702,047 B2 | | 4/2014 | Neurenberger et al. |
| 8,727,582 B2 | | 5/2014 | Brown et al. |
| 8,889,984 B2 | * | 11/2014 | Korcz .................... F16M 13/02 362/147 |
| 8,967,575 B1 | | 3/2015 | Gretz |
| 9,004,435 B2 | | 4/2015 | Wronski |
| 9,010,696 B2 | * | 4/2015 | Siddiqui ................ H02G 3/32 248/65 |
| 9,062,837 B2 | | 6/2015 | Wronski et al. |
| 9,068,722 B2 | | 6/2015 | Wronski et al. |
| 9,261,120 B2 | * | 2/2016 | Colangelo ............. F16B 2/22 |
| 9,285,074 B2 | | 3/2016 | Krocz et al. |
| 9,337,635 B2 | * | 5/2016 | Korcz .................... H02G 3/08 |
| 9,447,950 B1 | | 9/2016 | Wronski et al. |
| 9,470,360 B2 | | 10/2016 | Korcz et al. |
| 9,494,307 B2 | | 11/2016 | Wronski et al. |
| 9,627,867 B2 | | 4/2017 | Korcz et al. |
| 9,689,541 B2 | | 6/2017 | Wronski |
| 9,696,021 B2 | | 7/2017 | Wronski |
| 9,735,557 B1 | | 8/2017 | Gretz |
| 9,822,926 B2 | * | 11/2017 | Nikayin ................. H02G 3/125 |
| 9,899,817 B2 | | 2/2018 | Korcz et al. |
| 10,001,270 B2 | | 6/2018 | Wronski et al. |
| 10,006,618 B2 | | 6/2018 | Wronski et al. |
| 10,113,723 B2 | | 10/2018 | Wronski et al. |
| 10,135,232 B2 | | 11/2018 | Nikayin et al. |
| D841,432 S | | 2/2019 | Nikayin et al. |
| 10,333,288 B2 | | 6/2019 | Korcz et al. |
| 10,361,547 B2 | | 7/2019 | Kellerman |
| 2004/0182592 A1 | | 9/2004 | King et al. |
| 2005/0067546 A1 | | 3/2005 | Dinh |
| 2005/0247842 A1 | | 11/2005 | Wronski |
| 2006/0237601 A1 | * | 10/2006 | Rinderer ................ H02G 3/125 248/200.1 |
| 2012/0018600 A1 | | 1/2012 | Kerr, Jr. |
| 2016/0126711 A1 | | 5/2016 | Colangelo et al. |
| 2017/0229852 A1 | | 8/2017 | Jones et al. |
| 2018/0292076 A1 | | 10/2018 | Wronski |
| 2019/0195474 A1 | | 6/2019 | Wronski et al. |
| 2019/0296534 A1 | | 9/2019 | Kellerman |

FOREIGN PATENT DOCUMENTS

| | | |
|---|---|---|
| WO | 2011097026 A1 | 8/2011 |
| WO | 2015057260 A1 | 4/2015 |

(56) References Cited

FOREIGN PATENT DOCUMENTS

WO  2016168402 A1  10/2016
WO  2018100329 A1  6/2018

OTHER PUBLICATIONS

NVent Caddy Heavy Duty T-Grid Box Hanger, spec sheet, 2 pages, Copyright 2020 nVent.
NVent Caddy Adjustable T-Grid Box Hanger, spec sheet, 1 page, Copyright 2020 nVent.
Britclips Support Steel-T-Grid Box Hanger Support, product sheet, 3 pages, <https://www.cmwltd.co.uk/cable-containment-systems/britclip-fixings/britclips-support-steel-t-grid-box-hanger-support-each>.
Eaton Fasteners B-Line Series, product catalog, 252 pages, Copyright 2018 Eaton.
SSB-TBAR Simple Support Bracket with T-Bar Drop Ceiling Mounting Clips, screen shot of product description, 1 pages, Copyright 2020 Orbit Industries Inc.
Topaz Heavy Duty T-Grid Box Hanger with Mounting Clip, product sheet, 1 page.
Skil Zone Home Improvement Videos, How to Install Recessed Lighting, <https://www.youtube.com/watch?app=desktop&v=6jEuRzLRbXY>, Sep. 20, 2010.
NVent Caddy Glider Electrical Box Attachment, Screwless, product sheet, 1 page, Copyright 2020 nVent.
Arlington Specialty Boxes, product catalog, 35 pages, www.aifittings.com.

\* cited by examiner

MOUNTING BRACKET FOR ELECTRICAL BOXES

CROSS-REFERENCE TO RELATED APPLICATIONS

This application claims priority to U.S. Provisional Patent Application No. 62/902,663, filed on Sep. 19, 2019 and titled Mounting Bracket for Electrical Boxes, the entirety of which is incorporated herein by reference.

BACKGROUND

In many applications, it may be useful to support and secure electrical boxes and other components. For example, in some instances, electrical boxes may be required to be secured within a ceiling structure at particular distances from certain other structures or components.

SUMMARY

Some embodiments of the invention provide a mounting bracket for securing an electrical box to a support bar or a threaded rod. The electrical box can include a back wall with first and second mounting openings. The mounting bracket can include a body, a first spring arm and a second spring arm that extend integrally from the body. Each of the first and second spring arms can extend to a free end, the free ends of the first and second spring arms being spaced apart from each other by a first resting distance in a rest orientation and being sized to collectively extend into the first mounting opening of the electrical box, the first resting distance being larger than a width of the first mounting opening. The mounting bracket can further include a third spring arm and a fourth spring arm that extend integrally from the body opposite the first and second spring arms. Each of the third and fourth spring arms can extend to a free end, the free ends of the third and fourth spring arms being spaced apart from each other by a second resting distance in a rest orientation and being sized to collectively extend into the second mounting opening of the electrical box, the second resting distance being larger than a width of the second mounting opening.

The first and second spring arms and the third and fourth spring arms, respectively, can be collectively and resiliently moveable relative to the body from the respective rest orientations to respective installation orientations and respective installed orientations. The free ends of the first and second spring arms can be spaced apart from each other by a first installation distance in the installation orientation, and the free ends of the third and fourth spring arms can be spaced apart from each other by a second installation distance in the installation orientation, the first and second installation distances being smaller, respectively, than the first and second resting distances and smaller, respectively, than the widths of the first and second mounting openings. Further, the free ends of the first and second spring arms can be spaced apart from each other by a first installed distance in the installed orientation, and the free ends of the third and fourth spring arms can be spaced apart from each other by a second installed distance in the installed orientation, the first and second installed distances being larger, respectively, than the first and second installation distances and smaller, respectively, than the first and second resting distances.

Some embodiments of the invention provide a bracket system for securing an electrical box to a ceiling structure, the electrical box including a back wall with a first mounting opening. The bracket system can include an integrally formed mounting bracket that includes a body, a first spring arm, and a second spring arm. Each spring arm can extend from the body and include a locking profile and an engagement feature. The first and second spring arms may be configured to be moved towards each other by simultaneous manual engagement of the engagement features, to align the locking profiles for insertion from a back side of the back wall of the electrical box into the first mounting opening of the electrical box. Further, the first and second spring arms may be configured to spring resiliently apart from each other, upon release of the engagement features with the locking profiles inserted into the first mounting opening, to secure the locking profiles against removal from the first mounting opening.

Some embodiments of the invention provide a method of installing an electrical box on a support bar or a threaded rod. A mounting bracket can be engaged with the support bar or the threaded rod. First and second spring arms of the mounting bracket can be manually squeezed together to insert free ends of the first and second spring arms into a first mounting opening of the electrical box, and the first and second spring arms can be manually released to resiliently move apart from each other with the free ends within the first mounting opening, to secure the electrical box to the mounting bracket at the first mounting opening. Further, third and fourth spring arms of the mounting bracket can be manually squeezed together, including while urging the electrical box towards the support bar or the threaded rod, to insert free ends thereof into a second mounting opening of the electrical box, and the third and fourth spring arms can be manually released to resiliently move apart from each other with the free ends within the second mounting opening, to secure the electrical box to the mounting bracket at the second mounting opening.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
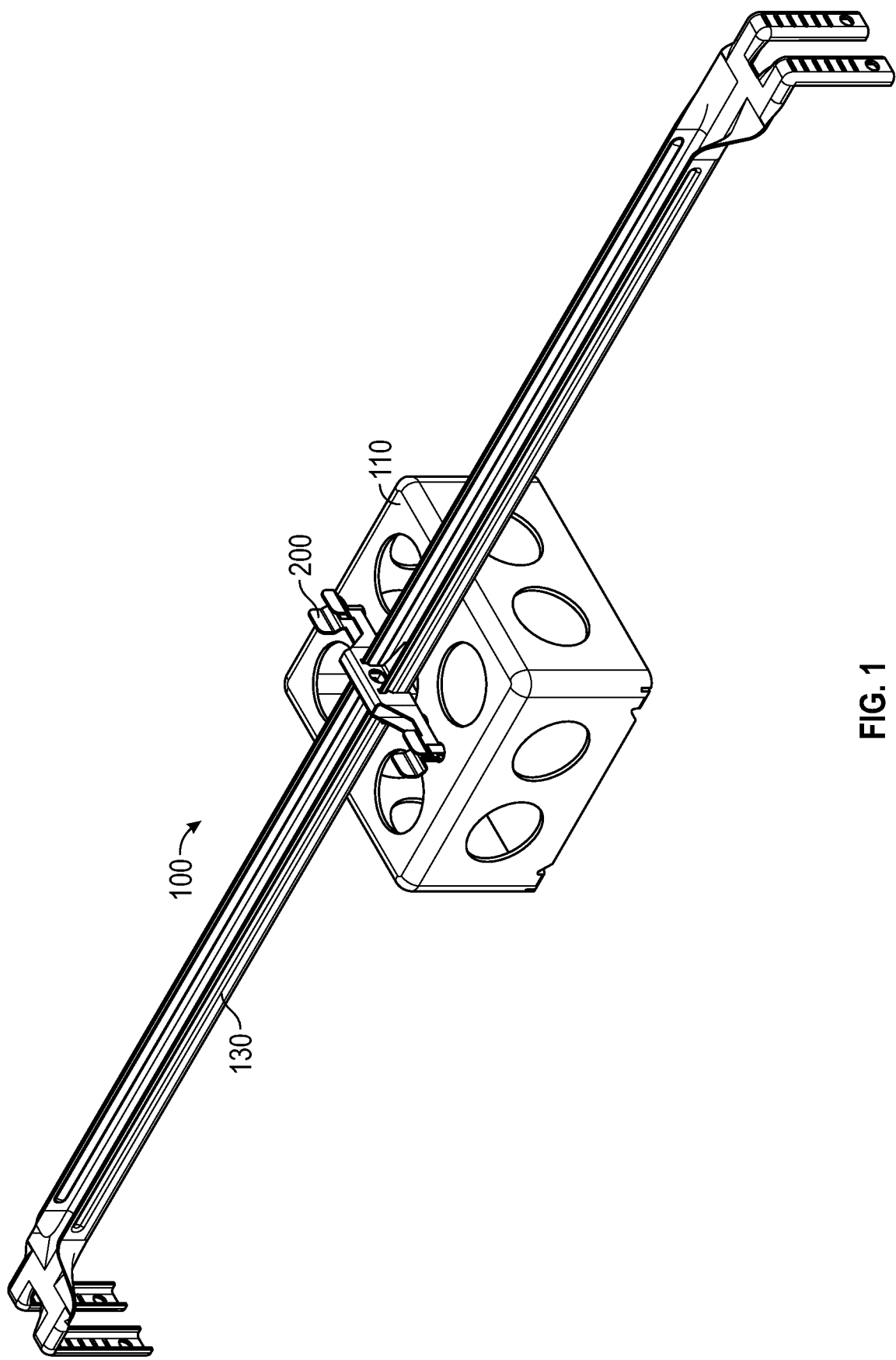
FIG. 1 is a top isometric view of an electrical box and a bracket system according to an embodiment of the invention, in an example installation, with the bracket system including a mounting bracket and a support bar.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular embodiment and perspective described. For example, reference to features or directions as "horizontal," "vertical," "front," "rear," "left," "right," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features.

As used herein in the context of activities or engagement of components, unless otherwise specified or limited, "manual" refers to the use of human hands. In some cases, "manual" engagement or activity can include direct manual engagement or activity: i.e., engagement or activity directly conducted by a user's hands (e.g., a user grasping or manipulating an object by hand). In some cases, "manual" engagement or activity can include engagement or activity via a non-powered hand tool (e.g., pliers).

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, in some contexts, it may be useful to secure or support electrical boxes and other components relative to structures. For example, electrical components, such as electrical boxes, may need to be mounted in a ceiling structure. Conventional mounting assemblies use fasteners to secure an electrical box to a support bar within the ceiling structure, and, thus, conventional mounting assemblies may secure the electrical box in a fixed position. Accordingly, the electrical box cannot be easily relocated, which may lead to tedious and timely installation and adjustments of electrical systems. Embodiments of the invention can help alleviate these issues, and others. For example, embodiments of the invention can be used to support and secure electrical boxes, or other electrical components, at predetermined locations relative to other structures, including ceiling structures, without fasteners. Embodiments of the invention may also allow electrical boxes to be easily relocated along, added to, or removed from a support bar or other support structure (e.g., a threaded rod).

Although embodiments of the invention are presented below in the context of mounting brackets for electrical boxes, other configurations are possible. The principles disclosed herein, for example, can be used with a variety of objects, including light fixtures, vents, audio devices, and so on, and can be used to secure any variety of components in place.

Generally, some embodiments can include a bracket with one or more sets of spring arms that extend from a bracket body. Each of the sets of spring arms can be configured to be moved (e.g. manually squeezed) from a rest orientation to an installation orientation, so that sets of engagement features on the spring arms can be inserted into a corresponding common mounting opening on an electrical box (e.g., on a back wall thereof). With the engagement features inserted into the mounting openings, each of the sets of spring arms can then be released, so that the corresponding sets engagement features move resiliently apart from each other while still remaining within the corresponding mounting openings. This resilient movement can cause the engagement features to engage the electrical box and thereby be secured within the respective mounting openings, which can correspondingly secure the bracket to the electrical box. In some embodiments, two sets of spring arms can be provided, on opposing sides of a bracket body, with each set of spring arms configured to engage a single corresponding mounting opening on an electrical box or other object.

Referring to FIG. 1, embodiments of the present invention generally provide a bracket system for mounting and securing an electrical box or other object without a need for fasteners, or other added components. For example, in the embodiment illustrated, a bracket system 100 includes a support bar 130 and a mounting bracket 200 that can be used to secure an electrical box 110 to a ceiling structure (e.g., an acoustic tile ceiling). In particular, the support bar 130 is configured for use with a separate bracket to be secured to a structure of a grid ceiling arrangement, such as a T-grid bar (not shown) that includes a vertical stem with a widened top, although use of the bracket 200 or other brackets in other contexts is also possible.

Figure 2:
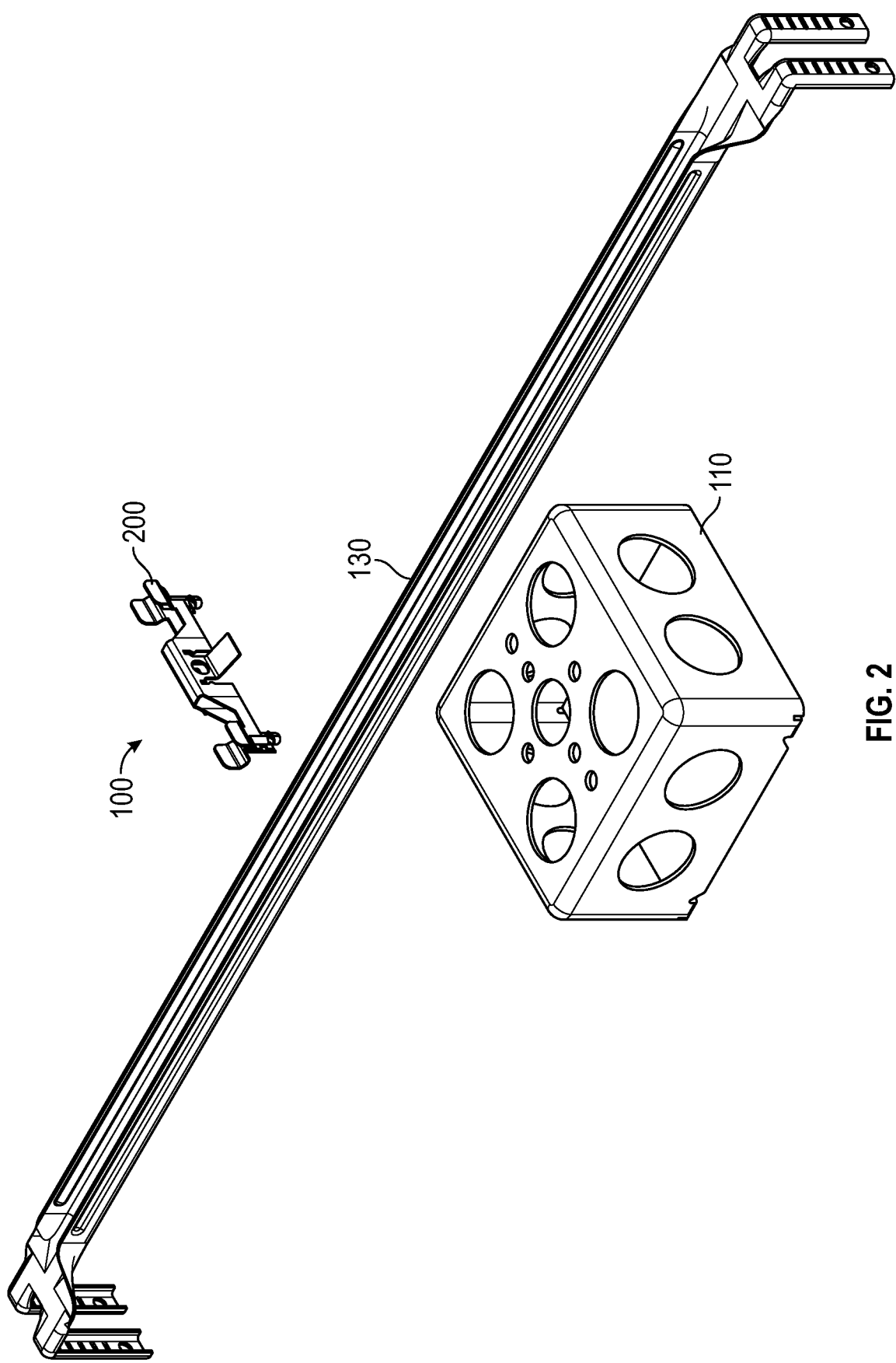
FIG. 2 is an exploded top isometric view of the bracket system and the electrical box of FIG. 1.

Turning to FIG. 2, as will be described in greater detail herein, the mounting bracket 200 is configured to secure the electrical box 110 to the support bar 130 without requiring additional components, such as separate threaded fasteners. Generally, the mounting bracket 200 is configured to snap onto the support bar 130, although some embodiments may not exhibit snap-fit arrangements. When secured to the support bar 130, the mounting bracket 200 may be adjusted by sliding the mounting bracket 200 along a length of the support bar 130. Once in a desired location, the electrical box 110 may be secured to the mounting bracket 200, which may generally secure the electrical box 110 to the mounting bracket 200 for use and, in some cases, also lock the mounting bracket 200—and the electrical box 110—in place on the support bar 130.

Figure 3:
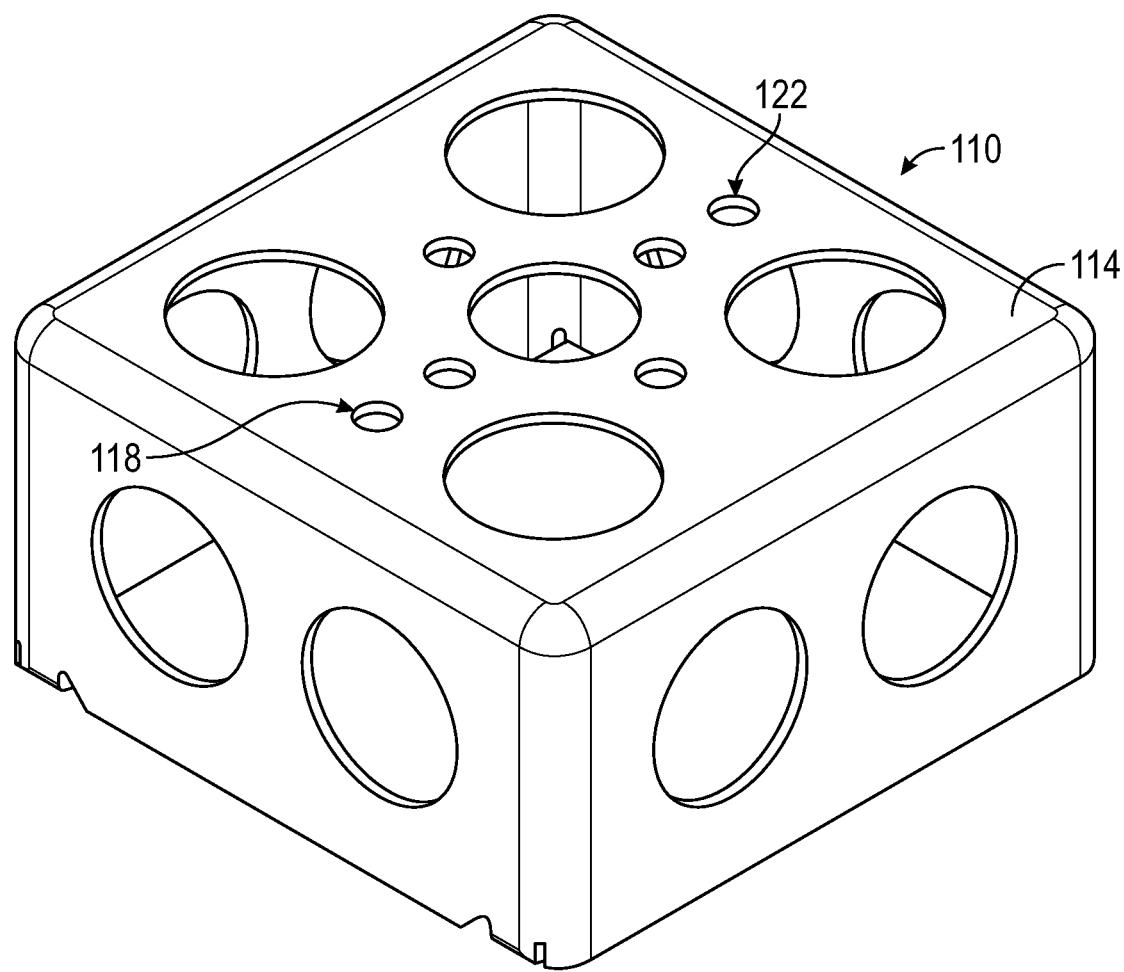
FIG. 3 is a rear isometric view of the electrical box of FIG. 1.

FIG. 3 illustrates an example configuration of the electrical box 110 that may be used with the bracket system 100 of FIGS. 1 and 2. The illustrated electrical box 110 is provided for example purposes only, and other configurations are possible. The electrical box 110 includes a back wall 114 with a plurality of mounting openings and knock-outs, including a first mounting opening 118 and a second mounting opening 122, each configured as a circular opening smaller than adjacent knock-out openings. However, a variety of other configurations are possible. For example, some embodiments of a bracket system according to the present invention may be configured to secure an electrical box that has at least one mounting opening. Further, although the electrical box 110 is discussed below as being secured via the mounting openings 118, 122, other mounting openings can be used in some configurations.

Figure 4:
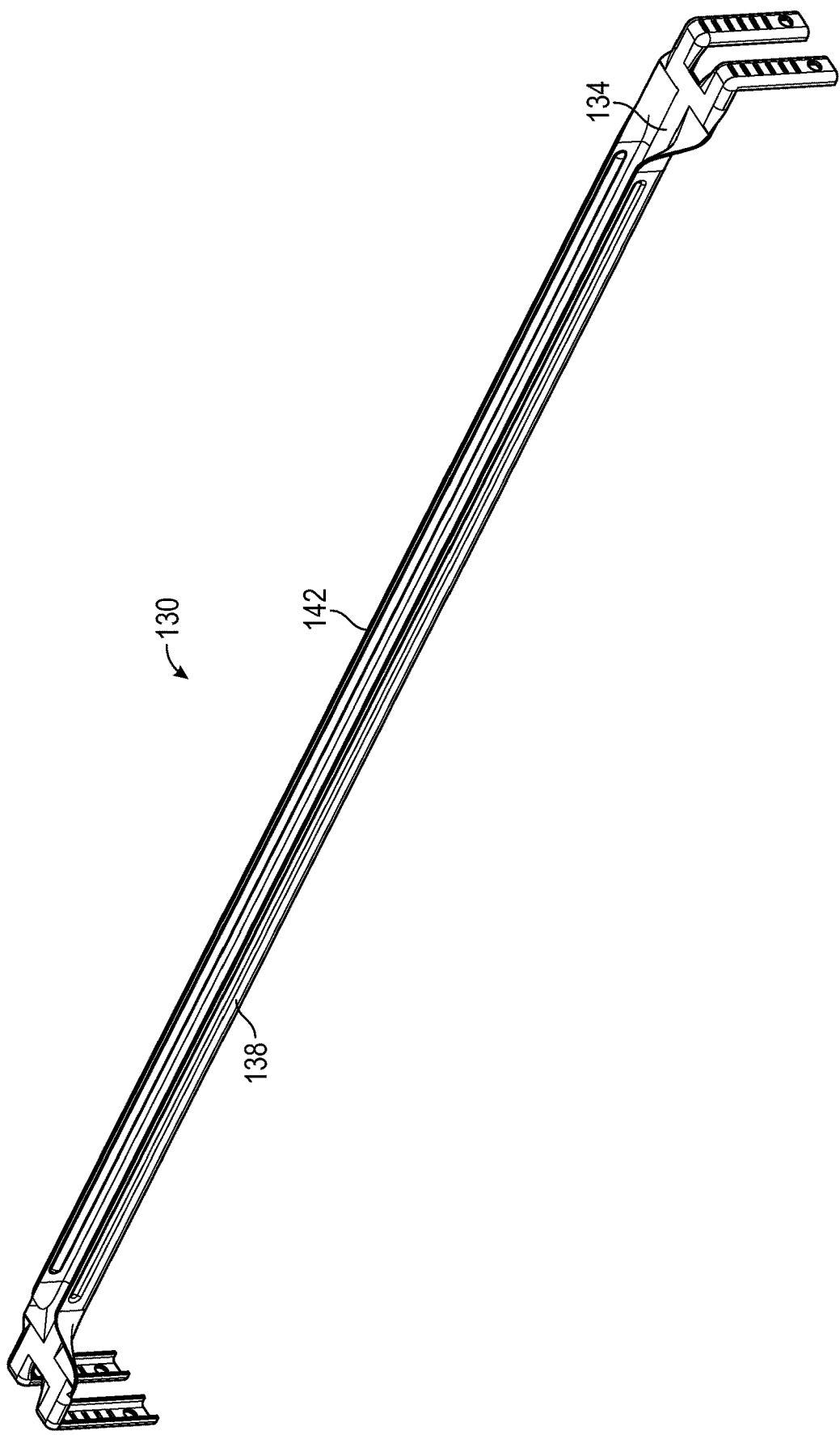
FIG. 4 is a top isometric view of the support bar of FIG. 1.
Figure 5:
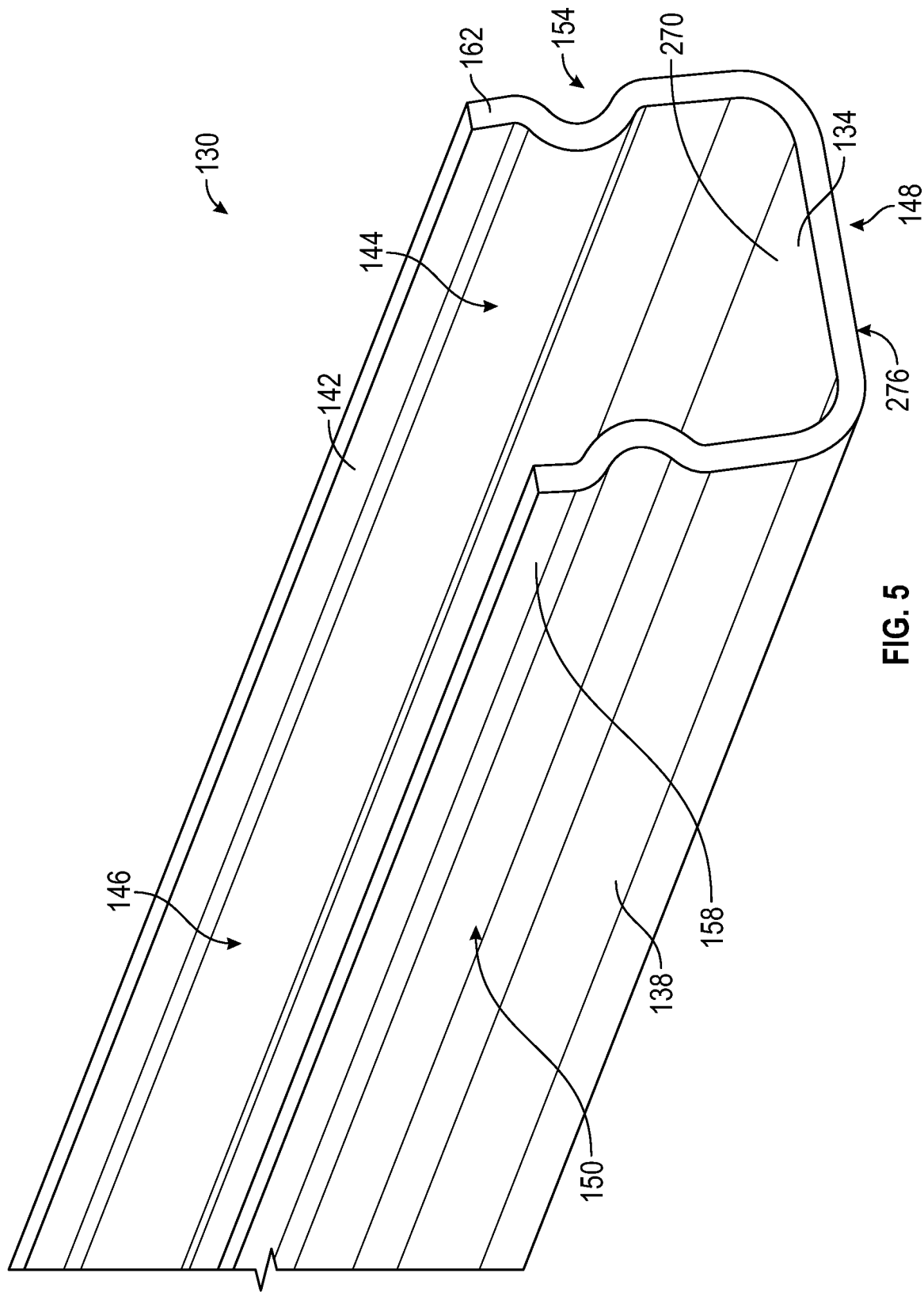
FIG. 5 is a top isometric sectional partial view of the support bar of FIG. 4.

FIGS. 4 and 5 illustrate an example configuration of the support bar 130 that is a component of the bracket system 100 of FIGS. 1 and 2. Similarly to the electrical box 110 (see, e.g., FIG. 3), the illustrated support bar 130 is provided for example purposes only. Brackets according to some embodiments of the invention can be used with other support bars or other support structures, including threaded rods.

As best seen in FIG. 5, a central support portion of the support bar 130 includes a base 134, a first leg 138, and a second leg 142 that provide a generally U-shaped profile. In particular, in the illustrated embodiment, the first leg 138 and the second leg 142 extend substantially perpendicularly from the base 134 on a first (e.g., top) side 144 of the support bar 130 to define an elongate channel 146 therebetween, although other channel geometries are possible. The support bar 130 further includes a second (e.g., bottom) side 148 that opposes the first side 144. Generally, the first side 144 and the second side 148 may be separated by the base 134.

In the embodiment illustrated, each of the first and second legs 138, 142 includes an elongate groove 150, 154, respectively. An elongate rib 158, 162 thus is distinguished along the first and second legs 138, 142, respectively, spaced apart from the base 134. However, in some instances, only one (or neither) of the first and second legs 138, 142 may include an elongate rib or an elongate groove.

Figure 6:
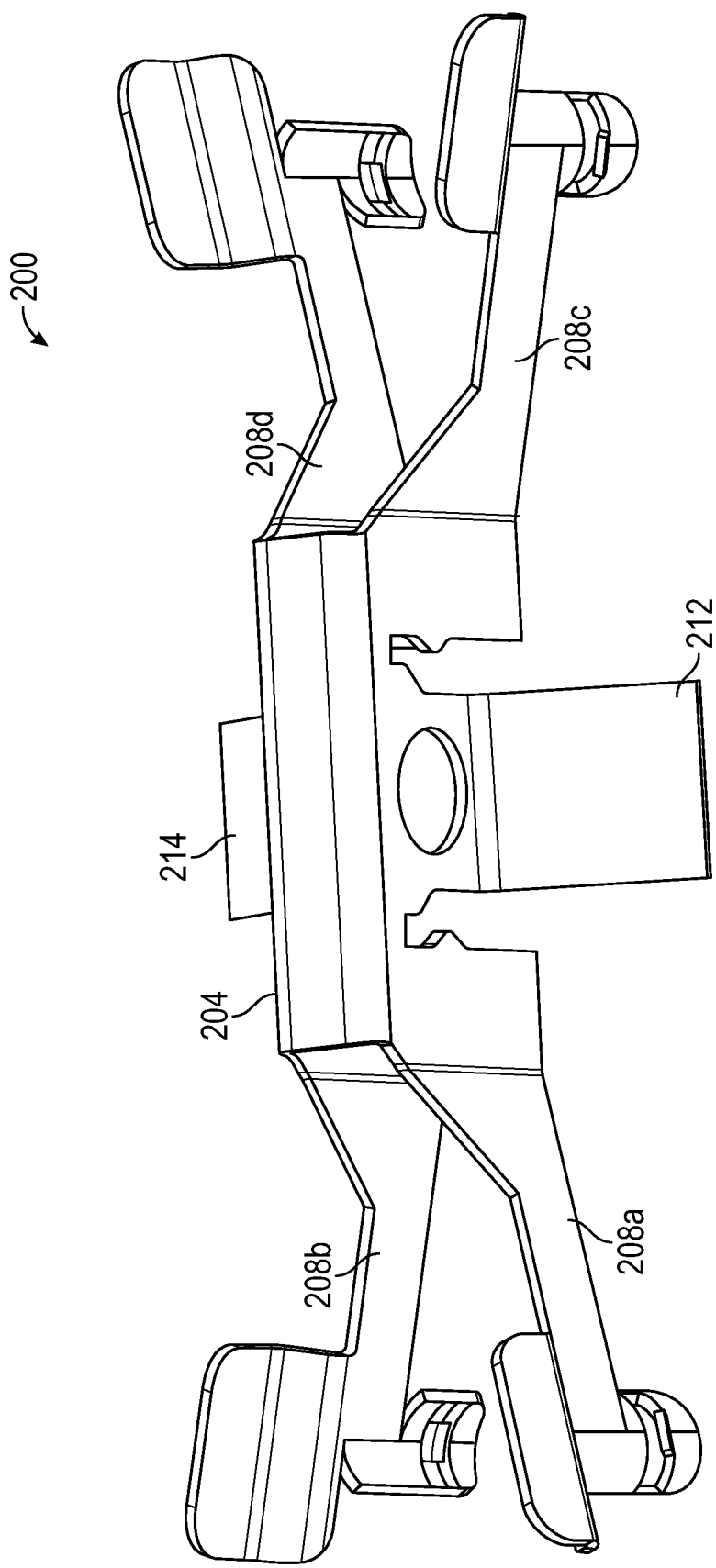
FIG. 6 is a top isometric view of the mounting bracket of FIG. 1 in a rest orientation.

FIGS. 6-10 illustrate an example configuration of the mounting bracket 200, for use in the bracket system 100 of FIGS. 1 and 2, or with other bracket systems (not shown). With reference to FIG. 6 in particular, the mounting bracket 200 is formed as a stamping from a single blank of material, although a variety of other approaches are possible. Likewise, although the mounting bracket 200 is illustrated with a centrally planar body 204, a first spring arm 208a, a second spring arm 208b, a third spring arm 208c, and a fourth spring arm 208d that are sized and oriented to secure an electrical box of standard configuration, other configurations are also possible. Such configurations can include, for example, those with only a first spring arm and a second spring arm (e.g., similar to the spring arms 208a, 208b). Further, although the mounting bracket 200 is depicted with a first support leg 212 and a second support leg 214 that are sized to engage the support bar 130 (see FIG. 4), alternative arrangements are possible, such as those with more or fewer (e.g., no) support legs.

Figure 7:
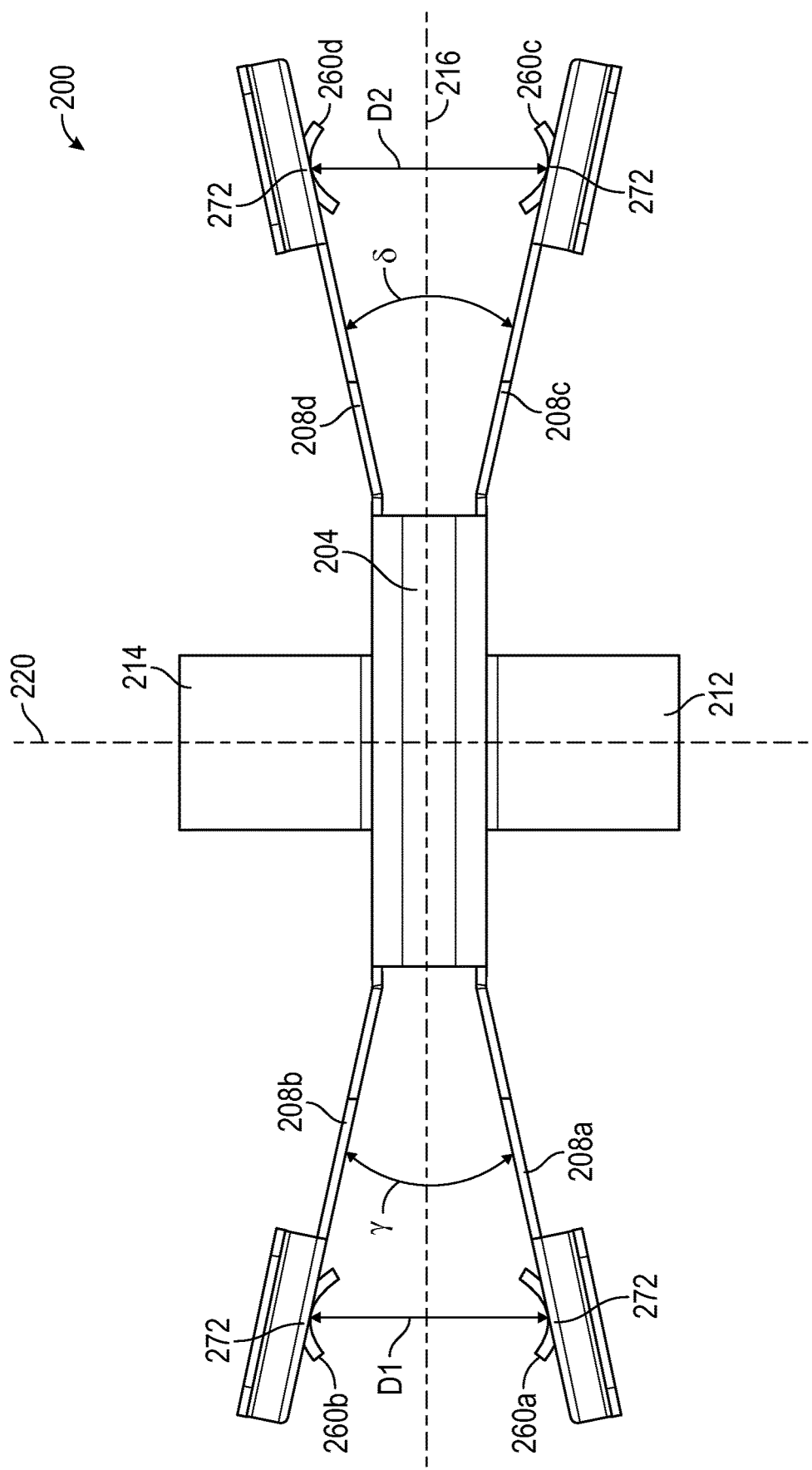
FIG. 7 is a top plan view of the mounting bracket of FIG. 6 in the rest orientation.

As best seen in FIG. 7, in the embodiment illustrated, the mounting bracket 200 is symmetrical when at rest (i.e., when free from external stresses), about a first axis 216 that extends perpendicularly to an elongate direction of the bracket 200 and of the elongate channel 146 of the support bar 130 (see FIG. 1) when the bracket 200 is installed on the support bar 130. The mounting bracket 200 is also symmetrical, when at rest, about a second axis 220 that extends perpendicularly to the first axis 216, and parallel with the elongate direction of the bracket 200 and of the elongate channel 146 of the support bar 130 (see FIG. 1) when the bracket 200 is installed on the support bar 130. As such, the first spring arm 208a and the third spring arm 208c are symmetrical to the second spring arm 208b and the fourth spring arm 208d about the first axis 216. Similarly, the first spring arm 208a and second spring arm 208b are symmetrical to the third spring arm 208c and the fourth spring arm 208d about the second axis 220. In some embodiments, a mounting bracket can also be symmetrical in other configurations. For example, as illustrated in other FIGS. the mounting bracket 200 can also be symmetrical when in installation or installed configurations. Further, in some embodiments, a mounting bracket may be asymmetrical or differently symmetrical than is illustrated for the mounting bracket 200.

Figure 9:
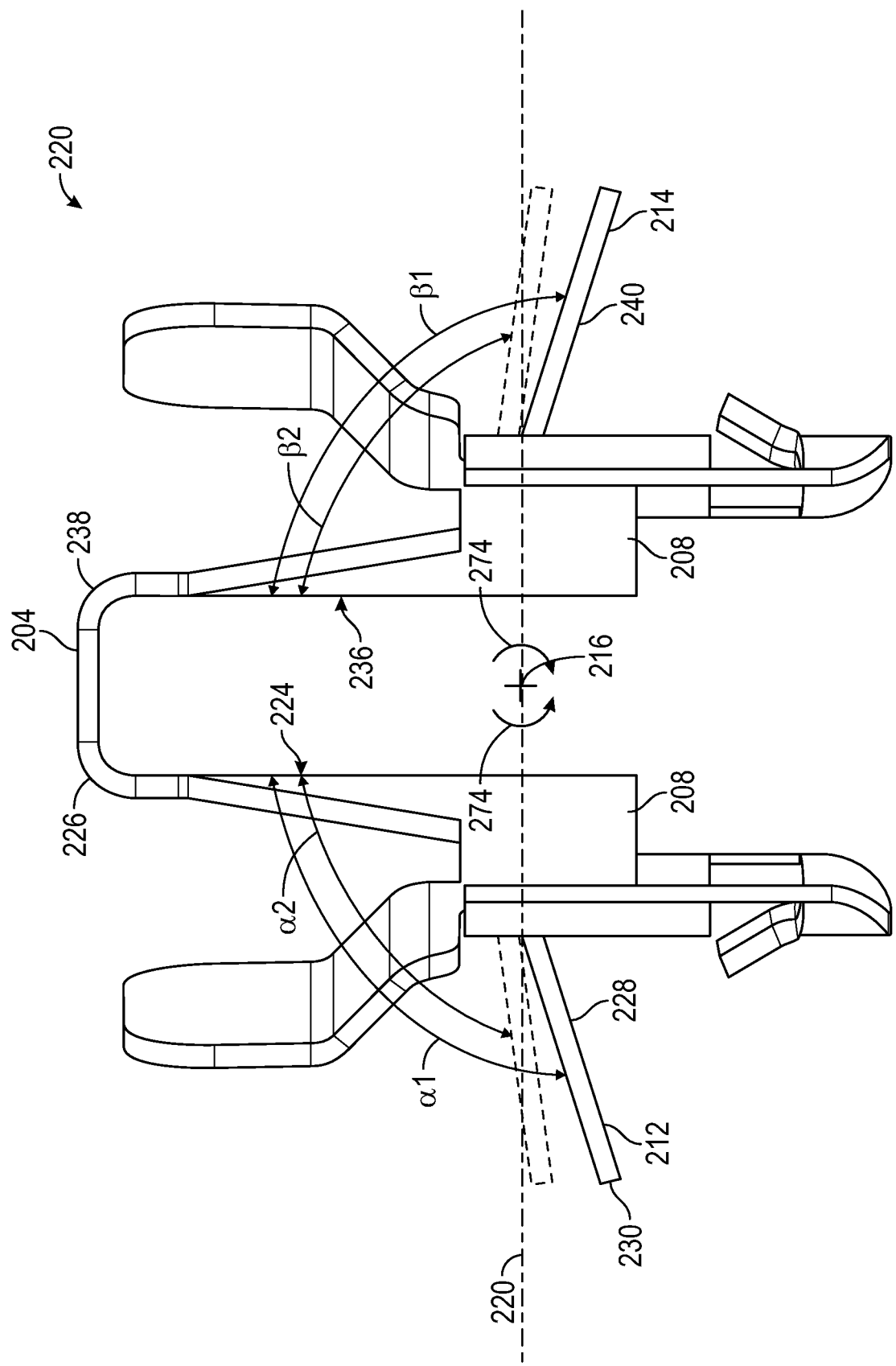
FIG. 9 is a front elevation view of the mounting bracket of FIG. 6.

In some embodiments, one or more support legs can extend from a bracket body to be disposed to resiliently engage a support structure when spring arms that also extend from the bracket body engage an electrical box that is to be secured to the support structure. In different embodiments, differently configured support legs (or no support legs) may be possible. As best seen in FIG. 9, for example, the first support leg 212 includes a first portion 224 that extends from a first edge 226 of the body 204 in a direction perpendicular to the central plane of the body 204, and a second portion 228 that extends from the first portion 224 to a first distal edge 230. A first bend line 232 (see FIG. 10) is disposed between the first portion 224 and the second portion 228, such that the linear first and second portions 228 extend at a non-zero angle relative to each other, although other embodiments may include smoothly curved or otherwise configured support legs. In particular, the second portion 228 extends at an angle $\alpha 1$ from the first portion 224 when in a rest position.

Similarly, the second support leg 214 includes a third portion 236 that extends from a second edge 238 of the body 204 in a direction perpendicularly with the body 204, and a fourth portion 240 that extends from the third portion 236 to a second distal edge 242, with a second bend line 244 being disposed between the third portion 236 and the fourth portion 240. The fourth portion 240 extends at an angle $\beta 1$ from the third portion 236 when in a rest position.

In the embodiment illustrated, the second support leg 214 is symmetrical to the first support leg 212 about the first axis 216 (see FIG. 7). As such, the angle $\alpha 1$ and the angle $\beta 1$ are substantially equal (i.e., equal to within relevant manufacturing tolerances for parts of the same design). However, in some instances, the angle $\alpha 1$ may be greater than or less than the angle $\beta 1$. Likewise, as noted above, some embodiments may include differently configured support legs, including support legs that do not exhibit discrete bend lines and corresponding discrete angles.

As will be described in greater detail herein, the support legs 212, 214 are configured to resiliently deflect from the rest position to a deflected position. For example, as shown in FIG. 9 with dashed lines, the first support leg 212 is configured to deflect from the angle $\alpha 1$ to an angle $\alpha 2$ when in the deflected position, the angle $\alpha 2$ being less than the angle $\alpha 1$. Similarly, the second support leg 214 is configured to deflect from the angle $\beta 1$ to an angle $\beta 2$ when in the deflected position, the angle $\beta 2$ being less than the angle $\beta 1$. In some embodiments, the first and second support legs 212, 214 may bend at discrete locations or may more generally curve when moved from the angles $\alpha 1$ and $\beta 1$ to the angles $\alpha 2$ and $\beta 1$, respectively. Further, in some embodiments, the support legs 212, 214 may comprise a curved surface when in the rest position. Therefore, in some cases, angles corresponding to the angles $\alpha 1$ and $\alpha 2$ (or $\beta 1$ and $\beta 2$) may be measured differently, such as between a tangent line at a free end of the relevant support leg and a reference plane defined by the bracket body (e.g., a plane parallel to an elongate direction of the bracket body and perpendicular to a top surface of the bracket body).

Figure 10:
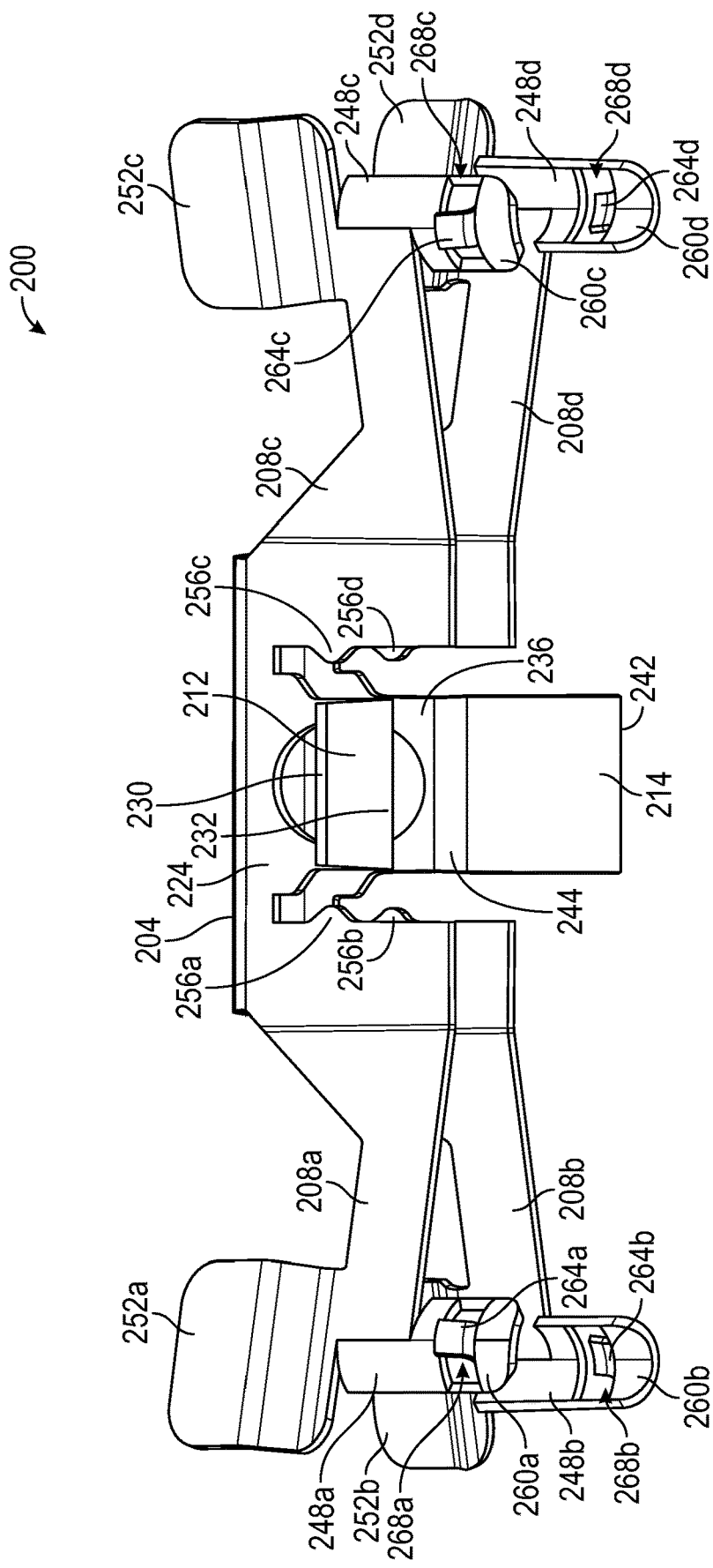
FIG. 10 is a bottom isometric view of the mounting bracket of FIG. 6.

Generally, spring arms according to the invention can include features that are configured to engage and secure electrical boxes or other objects at mounting features (e.g., mounting openings) thereof, as well as features that are configured to be engaged (e.g., manually engaged) to move the spring arms between different orientations. Turning to FIG. 10, for example, each of the spring arms 208a, 208b, 208c, 208d includes a locking profile 248a, 248b, 248c, 248d and an engagement feature 252a, 252b, 252c, 252d. In the embodiment illustrated, each of the locking profiles 248a, 248b, 248c, 248d is formed with a rounded (e.g., partly circular) cross-sectional profile and includes a rounded free end 260a, 260b, 260c, 260d and a locking tab 264a, 264b, 264c, 264d aligned with a corresponding aperture 268a, 268b, 268c, 268d.

Although the illustrated configuration of the locking profiles 248a, 248b, 248c, 248d and the free ends 260a, 260b, 260c, 260d may be advantageous for engagement of rear mounting openings on standard electrical boxes, other configurations are possible in other embodiments. For example, in different embodiments, locking profiles or free ends thereof can exhibit different configurations for engaging electrical boxes or other objects, including configurations without locking tabs, configurations with non-rounded or differently rounded profiles, and so on.

Continuing, in the illustrated example, each of the free ends 260a, 260b, 260c, 260d includes a rounded cross-sectional profile, with the profiles of the free ends 260a, 260b and 260c, 260d that are across the axis 216 (see FIG. 8) from each other exhibiting opposing concave curvature relative to each other. For example, in the embodiment illustrated, the cross-sectional profile of the round free end 260a disposed on the first spring arm 208a exhibits opposing curvature relative to the cross-sectional profile of the round free end 260b disposed on the second spring arm 208b. Similarly, the cross-sectional profile of the round free end 260c disposed on the third spring arm 208c exhibits opposing curvature relative to the cross-sectional profile of the round free end 260d disposed on the fourth spring arm 208d. As also noted above, the free ends 260a, 260b, 260c, 260d also exhibit rounded ends, such as may allow for easy insertion into a mounted opening, although other configurations are possible.

Figure 11:
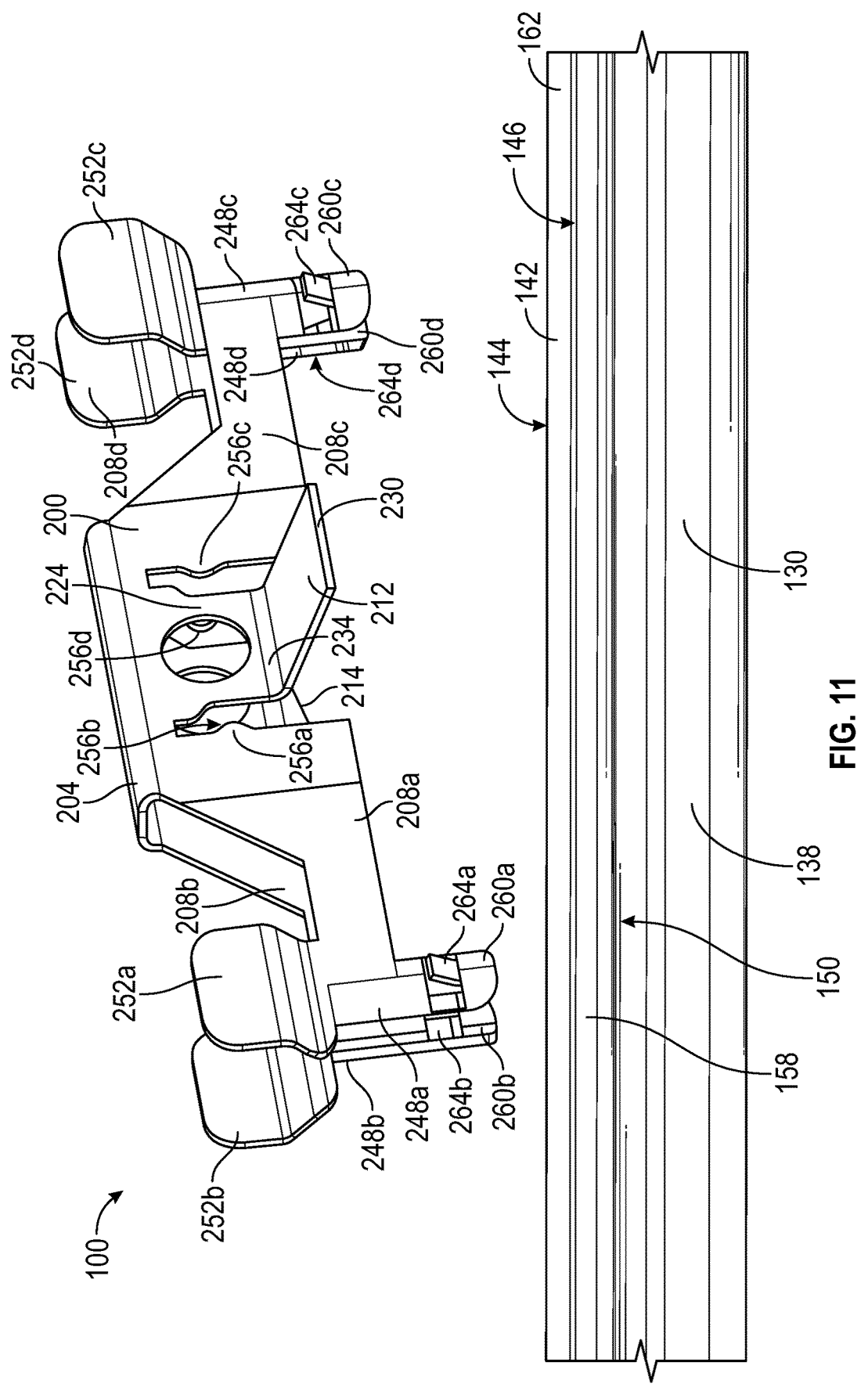
FIG. 11 is an exploded top isometric partial view of the bracket system of FIG. 1, including the mounting bracket and the support bar.

In the illustrated embodiment, the engagement features 252a, 252b, 252c, 252d are formed as widened tabs extending from the respective spring arm 208a, 208b, 208c, 208d opposite the respective locking profile 248a, 248b, 248c, 248d. Further, as shown in FIG. 11, the tabs of the engagement features 252a, 252b, 252c, 252d exhibit an outwardly flared geometry, relative to the elongate directions of the respective spring arms 208a, 208b, 208c, 208d, such as may allow for ergonomic engagement by a user. In other embodiments, however, other configurations are possible, including configurations with contours that are formed without protruding as separate features away from the associated spring arms (e.g., as depressions or texturing on a spring arm rather than distinct protruding tabs).

As with other features discussed above, in different embodiments, locking tabs can be configured in a variety of ways. In the bracket 200, for example, the locking tabs 264a, 264b, 264c, 264d angle outwardly from the locking profiles 248a, 248b, 248c, 248d away from the free ends 260a, 260b, 260c, 260d. Thus, as also discussed below, the locking tabs 264a, 264b, 264c, 264d can be disposed to effectively secure the locking profiles 248a, 248b, 248c, 248d against withdrawal from a mounting opening. Further, the locking tabs 264a, 264b, 264c, 264d are formed integrally with the locking profiles 248a, 248b, 248c, 248d, via stamping operations that also form the apertures 268a, 268b, 268c, 268d, although other approaches are also possible.

In some embodiments, other features on spring arms or a mounting bracket generally can also help to secure the mounting bracket to a support or to guide movement of the mounting bracket along the support. As also shown in FIG. 10, for example, a set of protrusions 256a, 256b, 256c, 256d extend from the respective spring arm 208a, 208b, 208c, 208d towards the second axis 220 (see FIG. 7). The protrusions 256a, 256b, 256c, 256d thus extend from the respective spring arm 208a, 208b, 208c, 208d towards at least one of the first support leg 212 and the second support leg 214, adjacent to the first and third portions 224, 236 thereof.

Figure 12:
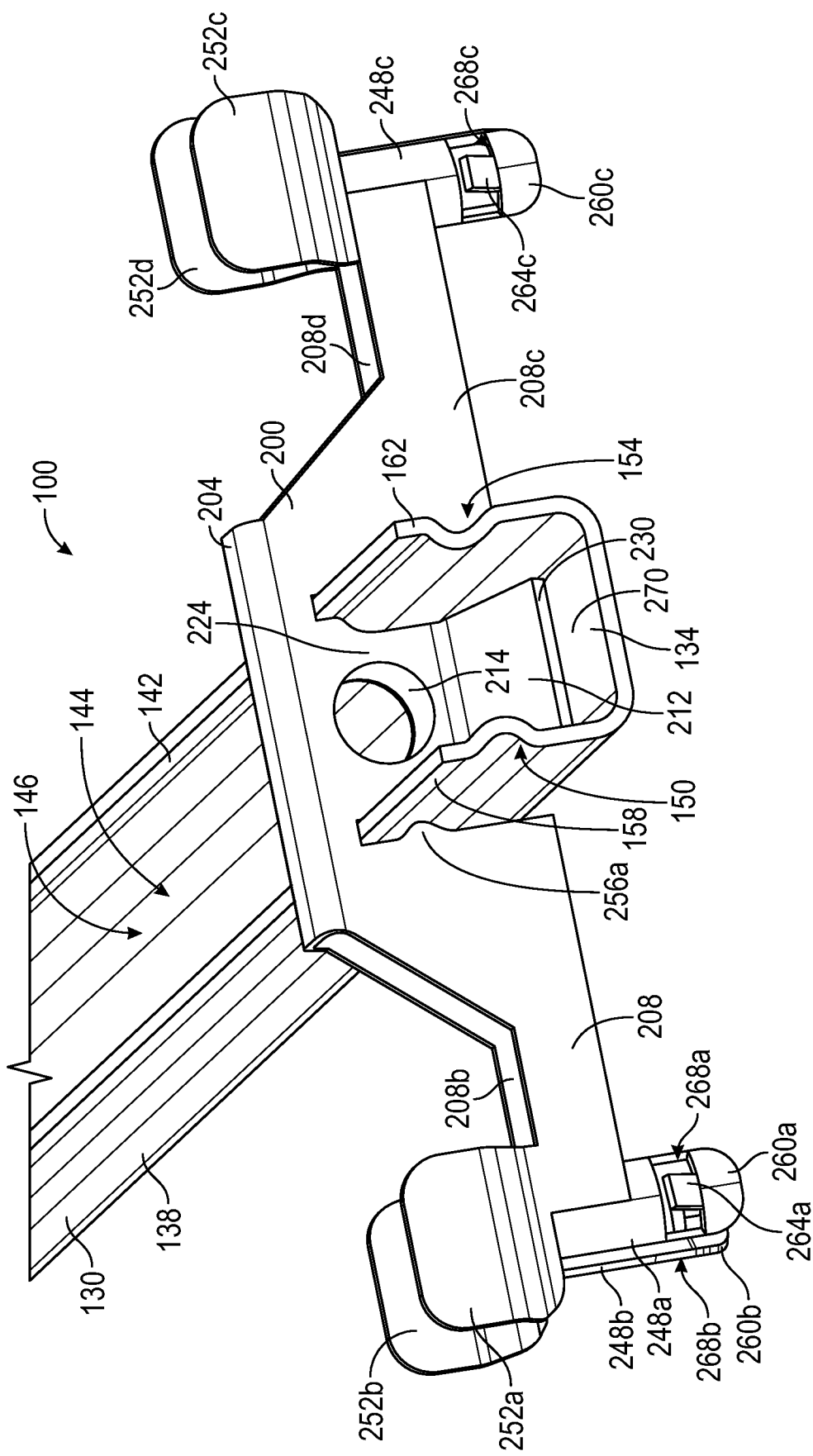
FIG. 12 is a top isometric partial view of the bracket system of FIG. 1, including the mounting bracket and a sectional view of the support bar.

Turning to FIGS. 11 and 12, when the bracket system 100 is assembled, each of the protrusions 256a, 256b, 256c, 256d is configured to fit within a respective one of the elongated grooves 150, 154 that are formed by the first and second legs 138, 142 of the support bar 130. More specifically, as best shown in FIG. 12, the protrusion 256a disposed on the first spring arm 208a extends into and bears against the elongate groove 150 formed by the first leg 138. Similarly, the protrusion 256b disposed on the second spring arm 208b extends into and bears against the elongate groove 150 formed by the first leg 138, and the third and fourth protrusions 256c, 256d (see FIG. 10) disposed on the third and fourth spring arms 208c, 208d, respectively, extend into and bear against the elongate groove 154 formed by the second leg 142.

In some embodiments, a mounting bracket can be configured to snap onto a support bar, including through snap-fit interaction between protrusions and grooves. For example, the mounting bracket 200 is configured to snap onto the support bar 130 by being pressed toward the first side 144 of the support bar 130, with the support legs 212, 214 within the elongate channel 146 of the support bar 130, so that the protrusions 256a, 256b, 256c, 256d (see FIG. 10) snap into the elongate grooves 150, 154. With the bracket 200 thus installed, the support legs 212, 214 are disposed within the elongate channel 146 of the support bar 130 such that the first and second distal edges 230, 242 (second distal edge 242 not visible in FIG. 12) thereof contact or bear against a first surface 270 of the support bar. As a result, the mounting bracket 200 may be easily and removably secured to the support bar 130, including for shipping as well as during installation. Further, due to the non-binding engagement between the protrusions 256a, 256b, 256c, 256d and the grooves 150, 154—at least when the bracket 200 is in a rest orientation, the mounting bracket 200 may freely slide along the support bar 130 while remaining securely retained to the support bar 130 until it is secured to the electrical box.

In the illustrated embodiment, the first and second distal edges 230, 242 of the support legs 212, 214 contact the base 134 of the support bar 130. Alternative embodiments, however, may have distal edges of one or more support leg contact one or more different surfaces of the support bar. In some cases, a non-edge surface of a support leg can contact a support bar instead of (or in addition to) a distal end of the support leg.

In the embodiment illustrated, when assembled as shown in FIGS. 11 and 12, the mounting bracket 200 is secured to the support bar 130 so that the first axis 216 (see FIG. 7) extends perpendicularly with the elongate direction of the elongate channel 146 of the support bar 130 and the second axis 220 (see FIG. 7) extends along the elongate channel 146. The first and second support legs 212, 214 thus are disposed within the elongate channel 146, and the first, second, third, and fourth spring arms 208a, 208b, 208c, 208d laterally extend away from the support bar 130.

Returning to FIGS. 7 and 8, the mounting bracket 200 is designed so that the spring arms 208a, 208b, 208c, 208d may be resiliently flexed from a rest orientation to an installation orientation to reversibly reduce a spacing between corresponding sets of the locking profiles 248a, 248b, 248c, 248d. In the rest orientation, shown in FIG. 7, the first spring arm 208a and the second spring arm 208b extend away from the body 204 and the first support leg 212 at a first angle γ from each other. The third spring arm 208c and the fourth spring arm 208d extend away from the body 204 and the first support leg 212 and second support leg 214 opposite the first and second spring arms 208a, 208b, at a second angle δ relative to each other. In the embodiment illustrated, the second angle δ is substantially equal to the first angle γ. In other instances, the second angle δ may be greater than or less than the first angle γ.

Generally, as also noted above, locking profiles of opposing spring arms may be spaced farther apart when a bracket is in a rest orientation than when the bracket is in an installation orientation (or an installed orientation). For example, as shown for the rest orientation in FIG. 7, the first free end 260a of the first spring arm 208a is spaced from the second free end 260b of the second spring arm 208b by a distance D1, the distance D1 being measured from an outermost reference point 272 on each free end 260a, 260b, which is a point on the curved profile of the free ends 260a, 260b that the respective spring arm 208a, 208b runs tangent to in the illustrated embodiment. The third free end 260c of the third spring arm 208c may be similarly spaced from the fourth free end 260d of the fourth free end 260d by a distance D2 in the rest orientation, as similarly measured between corresponding outermost reference points 272. Generally, the distances D1, D2 are substantially larger than a diameter of a corresponding mounting opening, such that sets of the free ends 260a, 260b and 260c, 260d cannot be simultaneously inserted into the corresponding mounting opening when the mounting bracket 200 is in the rest orientation. In the illustrated example, the distance D1 is substantially equal to the distance D2. However, the distances D1 and D2 may differ in alternative embodiments.

Figure 8:
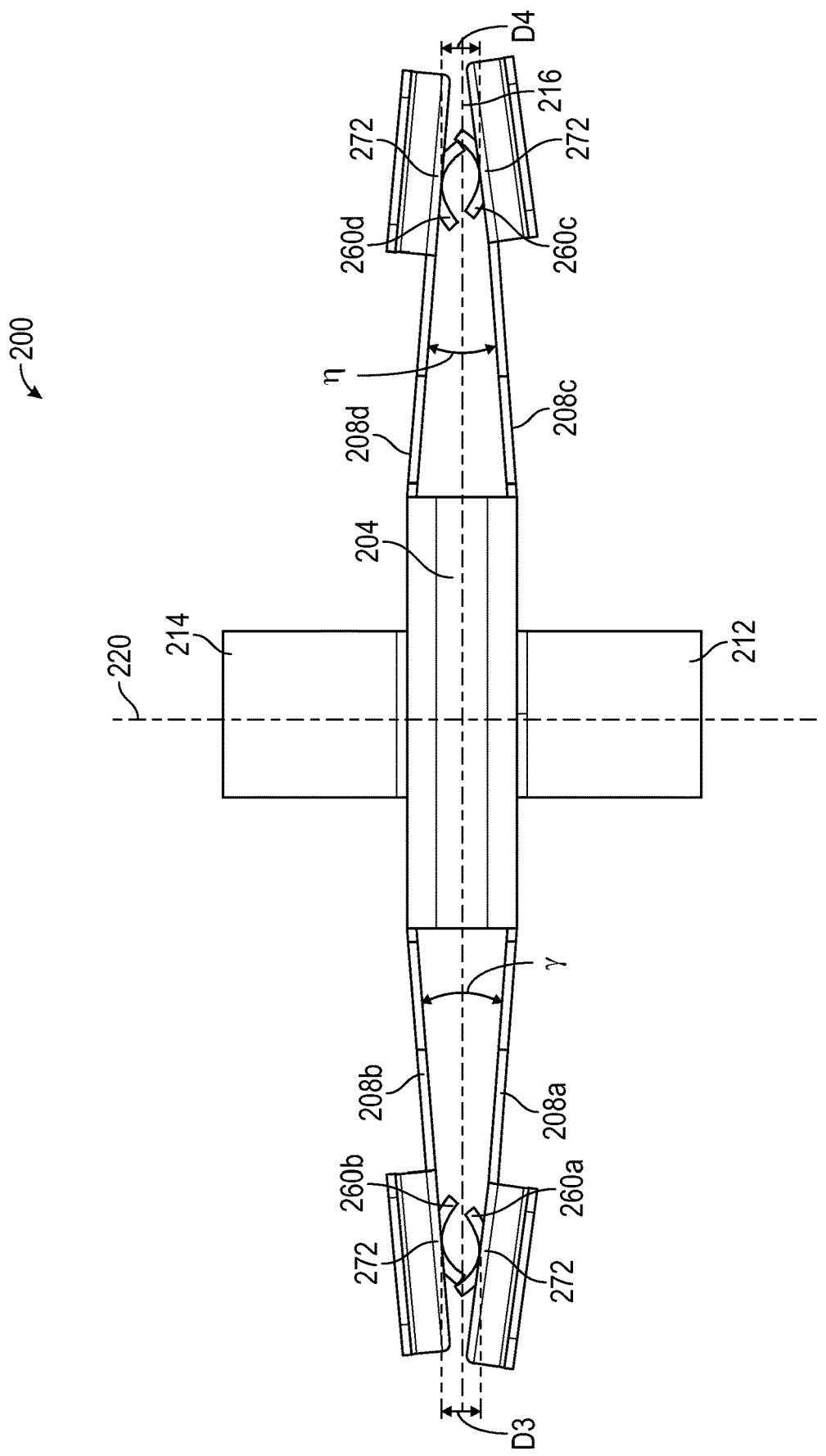
FIG. 8 is a top plan view of the mounting bracket of FIG. 6 in an installation orientation.

The first and second spring arms 208a, 208b are configured to be moved towards each other by simultaneous manual engagement of the engagement features to align the locking profiles to apply force generally in a vertical direction relative to the orientation of FIGS. 7 and 8. For example, the spring arms 208a, 208b can be urged together (e.g., manually squeezed together) from the rest orientation as shown in FIG. 7 to the installation orientation as shown in FIG. 8, in which sets of the locking tabs 264a, 264b, 264c, 264d are aligned for simultaneous insertion into a respective one mounting openings 118, 122 of the electrical box 110 (see, e.g., FIGS. 13 and 14). In particular, the first spring arm 208a and the second spring arm 208b may be urged together so that the first and second free ends 260a, 260b are spaced at a distance D3. Further, the first and second spring arms 208a, 208b may define a third angle ζ therebetween. Generally, the third distance D3 and the third angle ζ of the installation orientation are smaller than the first distance D1 and the first angle γ of the rest orientation of FIG. 7, respectively, and the distance D3 is generally smaller than a diameter of a corresponding mounting opening. In the illustrated embodiment, the first and second spring arms 208a, 208b extend from the body 204 such that they are angled toward each other when in the installation orientation. Correspondingly, the third angle ζ may be a negative angle when measured relative to the same reference as the first angle γ.

Still referring to FIG. 8, the third spring arm 208c and the fourth spring arm 208d are similarly configured. More specifically, the third spring arm 208c and the second spring arm 208d are configured to be urged together to an installation orientation in which the third and fourth free ends 260c, 260d are spaced by a distance D4 and the third and fourth spring arms 208c, 208d define a fourth angle η. Generally, the fourth distance D4 and the fourth angle η of the installation orientation are smaller than the second distance D2 and the second angle δ of the rest orientation of FIG. 7, respectively, and the distance D4 is generally smaller than a diameter of a corresponding mounting opening. Similar to the first and second spring arms 208a, 208b, in the illustrated embodiment, the third and fourth spring arms 208c, 208d extend from the body 204 such that they are angled toward each other when in the installation orientation. Correspondingly, the fourth angle η may be a negative angle when measured relative to the same reference as the second angle δ. Although the third distance D3 and the third angle ζ are substantially equal to the fourth distance D4 and the fourth angle η in the illustrated embodiment, respectively, the distances or the angles may differ in alternative embodiments.

In some embodiments, the resilient response of a bracket can be provided by flexing movement of a bracket body as well as flexing movement of spring arms, such as may provide a generally stronger and more secure engagement. For example, as the spring arms 208a, 208b are urged together, the body 204 is configured to flex along the first axis 216 (see FIG. 7) that extends perpendicularly with the elongate direction of the elongate channel 146 of the support bar 130 (see FIG. 4), and extends between the first and second spring arms 208a, 208b. More specifically, in the embodiment illustrated, with reference to FIG. 9, the body 204 may flex in a direction indicated by arrows 274 as the spring arms 208a, 208b and 208c, 208d are squeezed together, with a resilient response in the opposite direction helping to urge the spring arms 208, 208b, 208c, 208d back to the respective rest orientations. The body may flex in alternative or additional ways when (or as) any of the spring arms 208a, 208b, 208c, or 208d are flexed.

Figure 13:
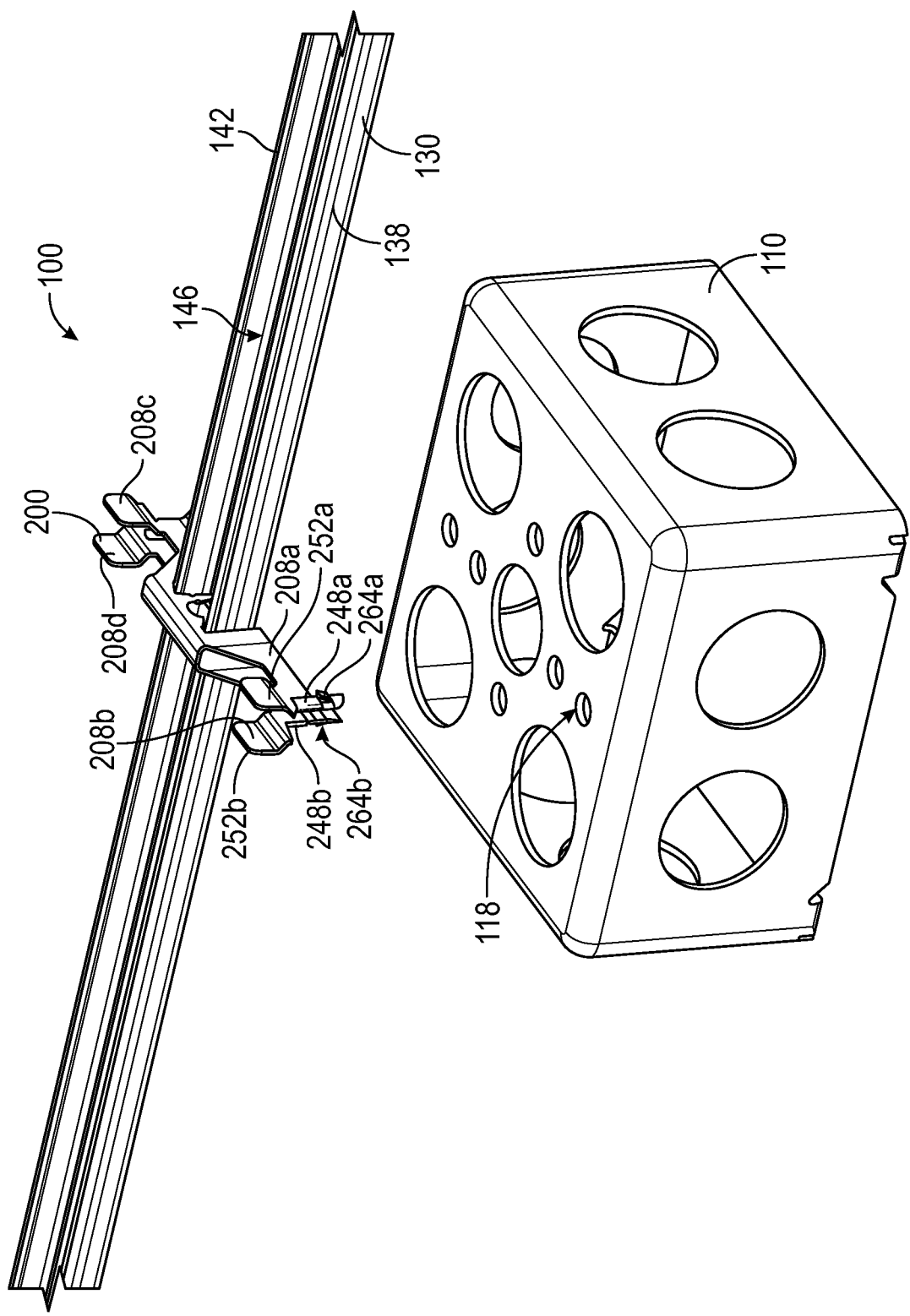
FIG. 13 is an exploded top isometric partial view of the bracket system and the electrical box of FIG. 1, with the mounting bracket in an installation orientation.
Figure 14:
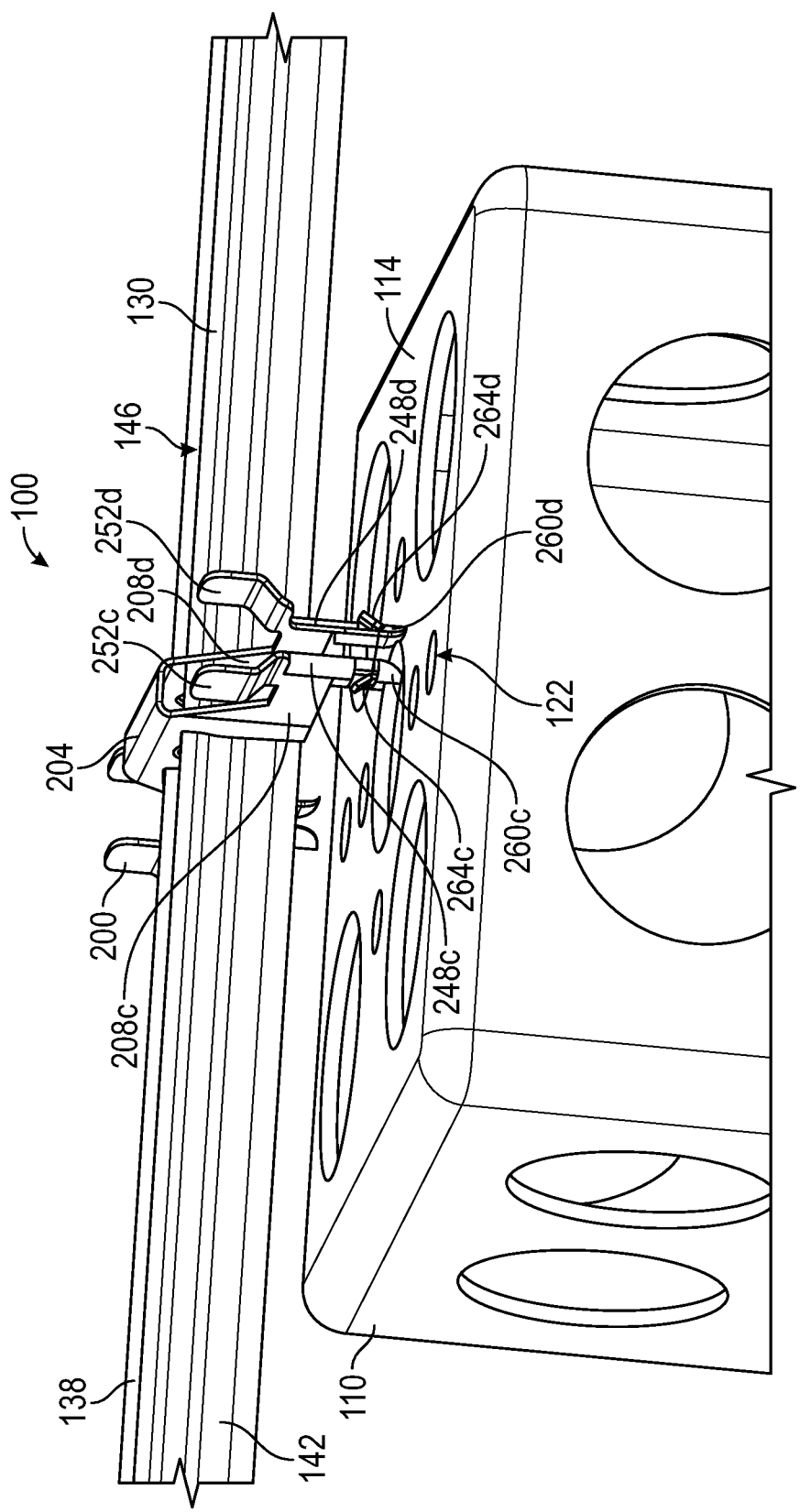
FIG. 14 is an exploded top isometric partial view of the bracket system and the electrical box of FIG. 1, with the mounting bracket in an installation orientation.

In some embodiments, as also discussed below, a mounting bracket can be moved to an installation orientation after being engaged with a support bar or other support structure. For example, as shown in FIGS. 12-14, the mounting bracket 200 can be moved to an installation orientation after being installed onto the support bar 130. In other embodiments, however, other sequence are possible. For example, in some cases, a mounting bracket can be moved to an installation (or other) orientation before being installed on a support structure. Similarly, in some cases, parts of a mounting bracket (e.g., a first set of spring arms) can be moved among different orientations, at different times than other parts of a mounting bracket (e.g., a second set of spring arms).

Figure 15:
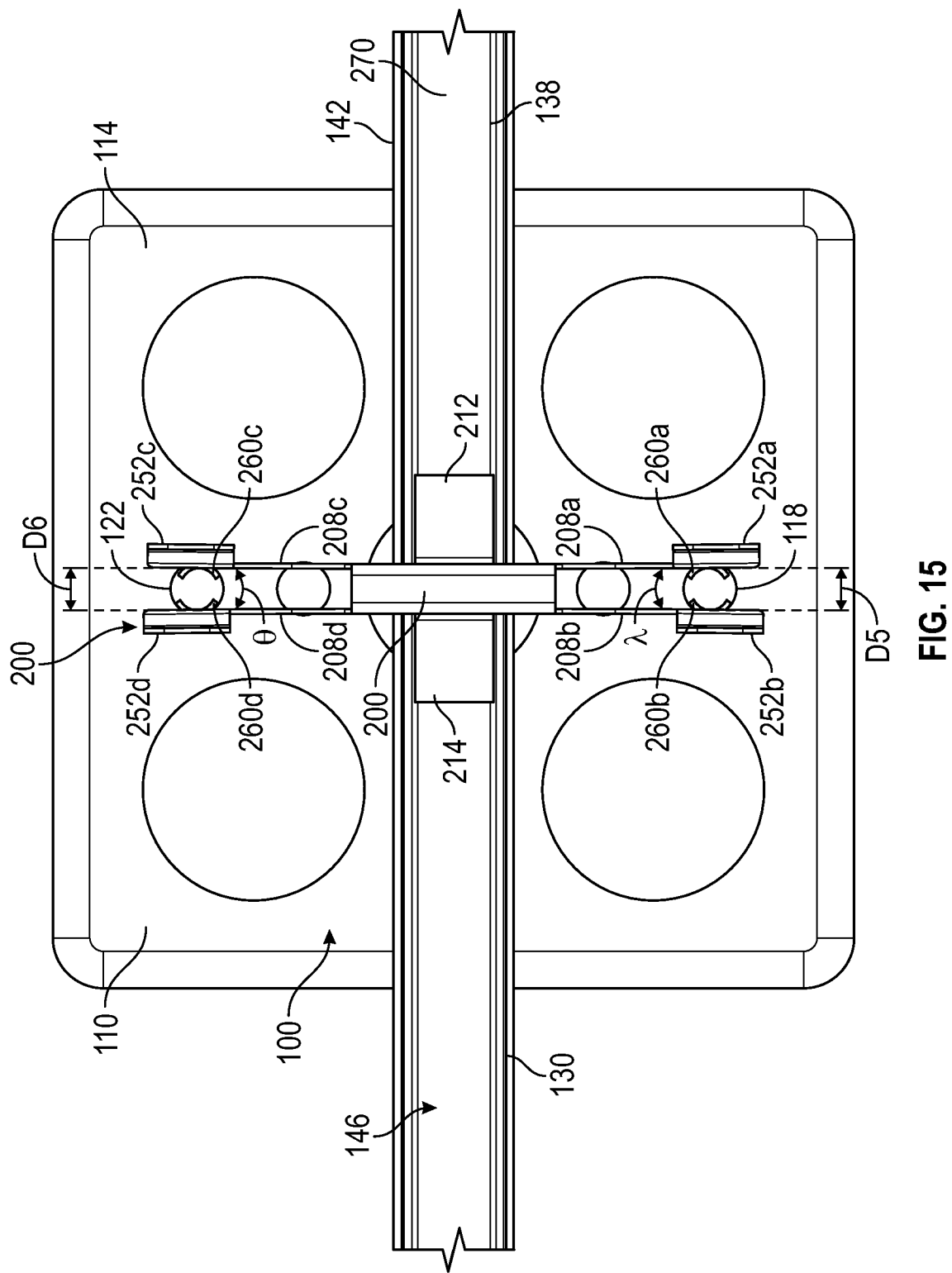
FIG. 15 is a top plan view of the bracket system and the electrical box of FIG. 1, with the mounting bracket in an installed orientation.

Referring to FIGS. 13-15, once the spring arms 208a, 208b have been moved to the installation orientation, the free ends 260a, 260b of the spring arms 208a, 208b can then be inserted into the first mounting opening 118. When the engagement features 252a, 252b are subsequently released, the first and second spring arms 208a, 208b are configured to spring resiliently apart from each other to secure the locking profiles 248a, 248b against removal from the first mounting opening 118 of the electrical box 110. As the spring arms 208a, 208b spring apart, partly due to their own resiliency, the body 204 is also configured to resiliently unflex to resiliently urge the first and second spring arms 208a, 208b apart. Thus, when the locking profiles 248a, 248b are inserted into a mounting opening, the combined resiliency of the spring arms 208a, 208b and the body 204 can help to urge the first and second spring arms 208a, 208b apart, into an installed orientation, and thereby urge the locking profiles 248a, 248b into engagement with opposing sides of the first mounting opening 118. Correspondingly, the locking profiles 248a, 248b can frictionally engage the electrical box 110 at the mounting opening 118 and the locking tabs 264a, 264b can be disposed to engage the front (inner) side of the back wall 114 of the electrical box 110 to further impede removal of the locking profiles 248a, 248b from the mounting opening 118. As a result, the electrical box 110 can be firmly secured to the mounting bracket 200 at the first mounting opening 118, without requiring separate fasteners.

As shown in FIG. 15, in particular, when in the installed orientation, the first and second spring arms 208a, 208b extend at a fifth angle θ relative to each other, which is less than the first angle γ of the rest orientation (see FIG. 7) but greater than the third angle ζ of the installation orientation (see FIG. 8). Correspondingly, in the installed orientation, the first and second free ends 260a, 260b are spaced by a distance D5. The distance D5 is smaller than the distance D1 of the rest orientation (see FIG. 7) and larger than the distance D3 of the installation orientation (see FIG. 8) in the illustrated embodiment. Thus, the resiliency of the spring arms 208a, 208b and of the mounting bracket 200 generally can urge the locking profiles 248a, 248b away from the installation orientation towards the rest orientation and thereby cause the free ends 260a, 260b into firm engagement with the electrical box 110 at the mounting opening 118. In particular, for the illustrated embodiment, the distance D5 is smaller than the diameter of the mounting opening 118, although other installation-orientation distances are possible for other embodiments.

Subsequently or simultaneously with installation of the locking profiles 248a, 248b into the first mounting opening 118, the third and fourth spring arms 208c, 208d can be manually squeezed towards each other for insertion of the respective free ends 260c, 260d into a second mounting opening 122 of the electrical box 110. Similarly, to the operations noted above for the spring arms 208a, 208b, once the free ends 260c, 260d are disposed within the second mounting opening 122, the third and fourth spring arms 208c, 208d can be manually released to resiliently secure the electrical box to the support bar at the second mounting opening 122.

In some implementations, it may be particularly useful to engage a first set of locking profiles with an electrical box or other object before engaging a second set of locking profiles. For example, with respect to the mounting bracket 200, first engaging the locking profiles 248a, 248b with the mounting opening 118 can help to generally secure the electrical box 110 to the support bar 130. The electrical box 110 can then be moved by a user, as convenient, to be engaged by the locking profiles 248c, 248d without the need to also continuously hold the electrical box 110 relative to gravity. For example, installation of the third and fourth spring arms 208c, 208d may include manually pressing the electrical box 110 towards the support bar 130 and the mounting bracket 200 after the mounting bracket 200 has been seated on the support bar 130 and the first and second spring arms 208a, 208b have been installed. In other cases, however, other approaches are possible.

Also similarly to the spring arms 208a, 208b, referring again to FIG. 15, in the installed orientation of the third and fourth spring arms 208c, 208d, with the locking profiles 248c, 248d of the third and fourth spring arms 208c, 208d inserted into and engaged with the second mounting opening 122, the third and fourth spring arms 208c, 208d extend at a sixth angle λ relative to each other. In particular, the sixth angle λ is less than the second angle δ of the rest orientation (see FIG. 7) but greater than the fourth angle η of the installation orientation (see FIG. 8). Further, in the installed orientation, the third and fourth free ends 260c, 260d are spaced by a distance D6 which is smaller than the distance D2 of the rest orientation (see FIG. 7) and larger than the distance D4 of the installation orientation (see FIG. 8) in the illustrated embodiment. In particular, for the illustrated embodiment, the distance D6 is smaller than the diameter of the mounting opening 122, although other installation-orientation distances are possible for other embodiments.

As discussed above, the mounting bracket 200 is generally symmetric and configured for symmetrical installation. Further, the mounting openings 118, 122 exhibit the same characteristic diameter. As such, the distances D5, D6 and the angles γ, λ are substantially equal. However, spacing and angles between the first, second, third, and fourth spring arms in any of the rest, installation, or installed orientations may vary in alternative embodiments.

As also discussed above, a first set of spring arms (e.g., the spring arms 208a, 208b) can be installed relative to one mounting opening before a second set of spring arms (e.g., the spring arms 208c, 208d) is installed relative to another mounting opening. Likewise, in some cases, one set of spring arms can be removed from the corresponding mounting opening before another set of spring arms (e.g., in a reversed process to the installation described relative to FIGS. 13-15). In other implementations, however, various operations for mounting a mounting bracket to a support bar or other structure and securing different sets of spring arms of the mounting bracket to an electrical box can be executed simultaneously or in different orders than is described above.

Figure 16:
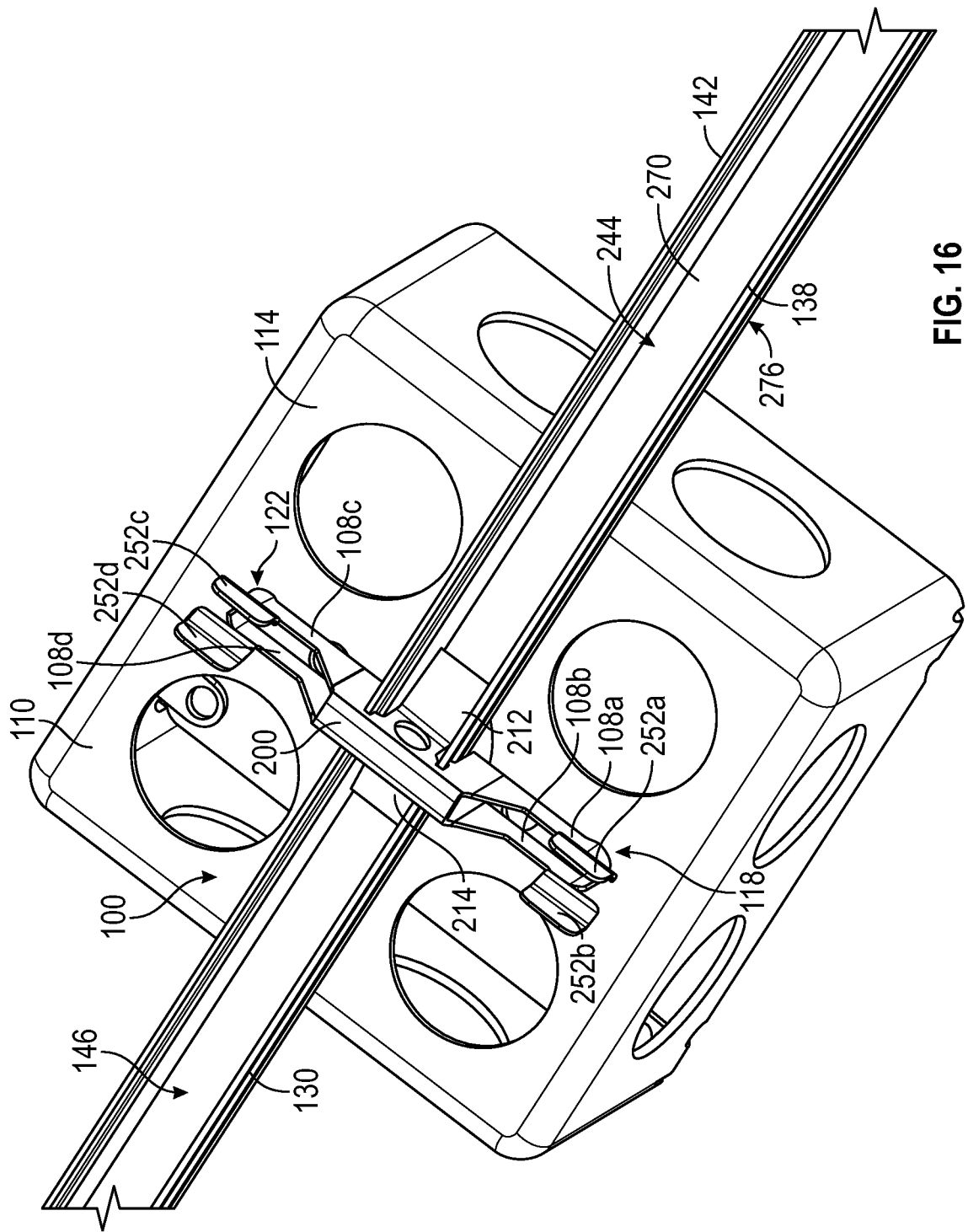
FIG. 16 is a top isometric view of the bracket system and the electrical box of FIG. 1, with the mounting bracket in an installed orientation.

In some embodiments, other features can also help to secure an electrical box to a support bar. Turning to FIG. 16, for example, when the mounting bracket 200 is secured to the electrical box 110 and the support bar 130, the first and second support legs 212, 214 resiliently flex to bear against the base 134 of the elongate channel 146 of the support bar 130. Correspondingly, the support legs 212, 214 can urge the mounting bracket 200 generally away from the base 134 (e.g., upward) and thereby urge the electrical box 110 towards the support bar 130. More specifically, because the first and second support legs 212, 214 are angled relative to the body 104, they are configured to resiliently bear on the support bar 130 and provide spring pressure to urge the mounting bracket 200 away from the support bar 130 when the mounting bracket 200 is in the installed orientation.

Figure 17:
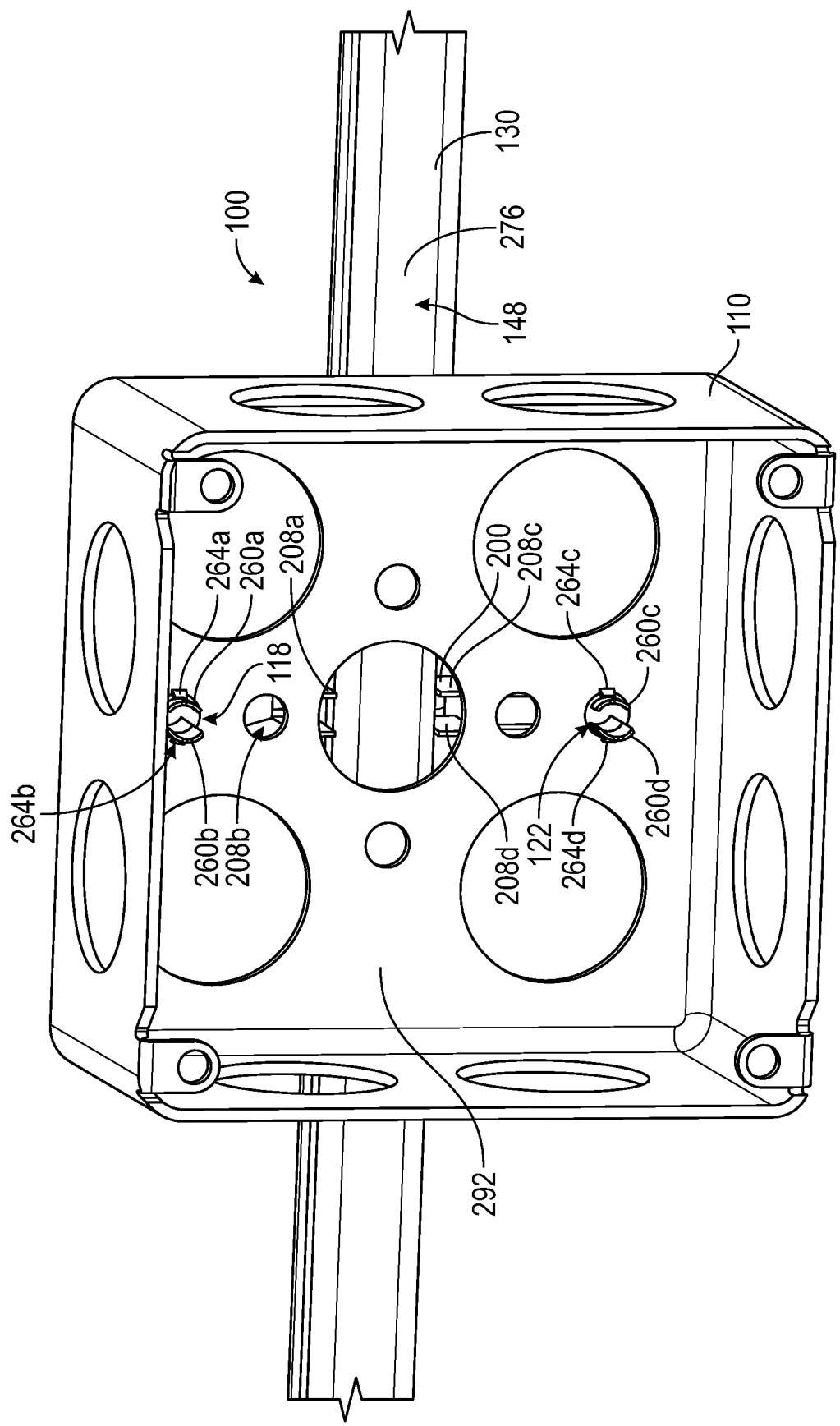
FIG. 17 is a bottom isometric view of the bracket system and the electrical box of FIG. 1, with the mounting bracket in an installed orientation.

Correspondingly, when the first, second, third, and fourth spring arms 208a, 208b, 208c, 208d secure the electrical box 110 to the mounting bracket 200, the first and second support legs 212, 214 resiliently urge the back wall 114 of the electrical box 110, via the first, second, third, and fourth spring arms 208a, 208b, 208c, 208d, towards the support bar 130. Therefore, in the illustrated embodiment, the support legs 212, 214 are configured to seat against the first surface 270 of the support bar 130, and the first, second, third, and fourth spring arms 208a, 208b, 208c, 208d are configured to secure the electrical box 110 so that the back wall 114 of the electrical box 110 bears against a second surface 276 of the support bar 130. In the illustrated embodiment, as illustrated in FIG. 17, the second surface 276 is on the second side 148 of the support bar 130, which opposes the first side 144 (see FIG. 5). Accordingly, the mounting bracket 200 surrounds the support bar 130 and can fully support the electrical box 110 relative thereto. In some embodiments, however, the mounting bracket may be configured to secure the electrical box to the support bar so that the mounting bracket and the electrical box bear against different surfaces of a support bar (e.g., other surfaces within the channel 146).

In some embodiments, the support legs 212, 214 can be resiliently flexed during operations to secure an electrical box to the support bracket 200. For example, under some approaches, the support bracket 200 can be secured to the support bar 130, and the spring arms 208a, 208b then engaged with the mounting opening 118. Once the spring arms 208a, 208b are secured, the opposing side of the box can then be urged towards the spring arms 208c, 208d (or vice versa), which may resiliently flex the support legs 212, 214 within the channel 146. With the spring arms 208c, 208d then secured at the mounting opening 122, the support legs 212, 214 may remain resiliently flexed relative to the support bar 130, so that the electrical box is held firmly (e.g., to prevent sliding) on the support bar 130.

In different embodiments, different structural arrangements can be used to secure free ends of spring arms within (or otherwise to) mounting openings. Turning to FIG. 17, for example, and as also discussed above, when the mounting bracket 200 is in the installed orientation, the locking tabs 264a, 264b are configured to abut an interior surface 292 of the electrical box 110 adjacent the first mounting opening 118. The locking tabs 264c, 264d are similarly configured to abut the interior surface 292 of the electrical box 110 adjacent the second mounting opening 122. Thus, the locking tabs 264a, 264b, 264c, 26d can secure the electrical box 110 to the mounting bracket 200 and, thereby, to the support bar 130. In some cases, locking tabs can be configured to snap into engagement with an electrical box, such as during insertion of a corresponding locking profile into a mounting opening of the electrical box. In some cases, as also noted above, locking tabs can be configured differently than the locking tabs 264a, 264b, 264c, 264d relative to the relevant locking profiles.

FIGS. 18-22 illustrate example configurations of a bracket system 300 according to the present disclosure. The bracket system 300 is generally similar in design and functionality to the bracket system 300 of FIG. 1-17, with similar elements identified using like reference numerals. However, the bracket system 300 may differ in some aspects as described herein or as apparent from the figures. For example, referring to FIG. 18, the bracket system 300 includes a mounting bracket 304 that is substantially similar to the mounting bracket 200 of FIGS. 1-17, but is configured for use with both a support bar and a threaded rod.

Figure 18:
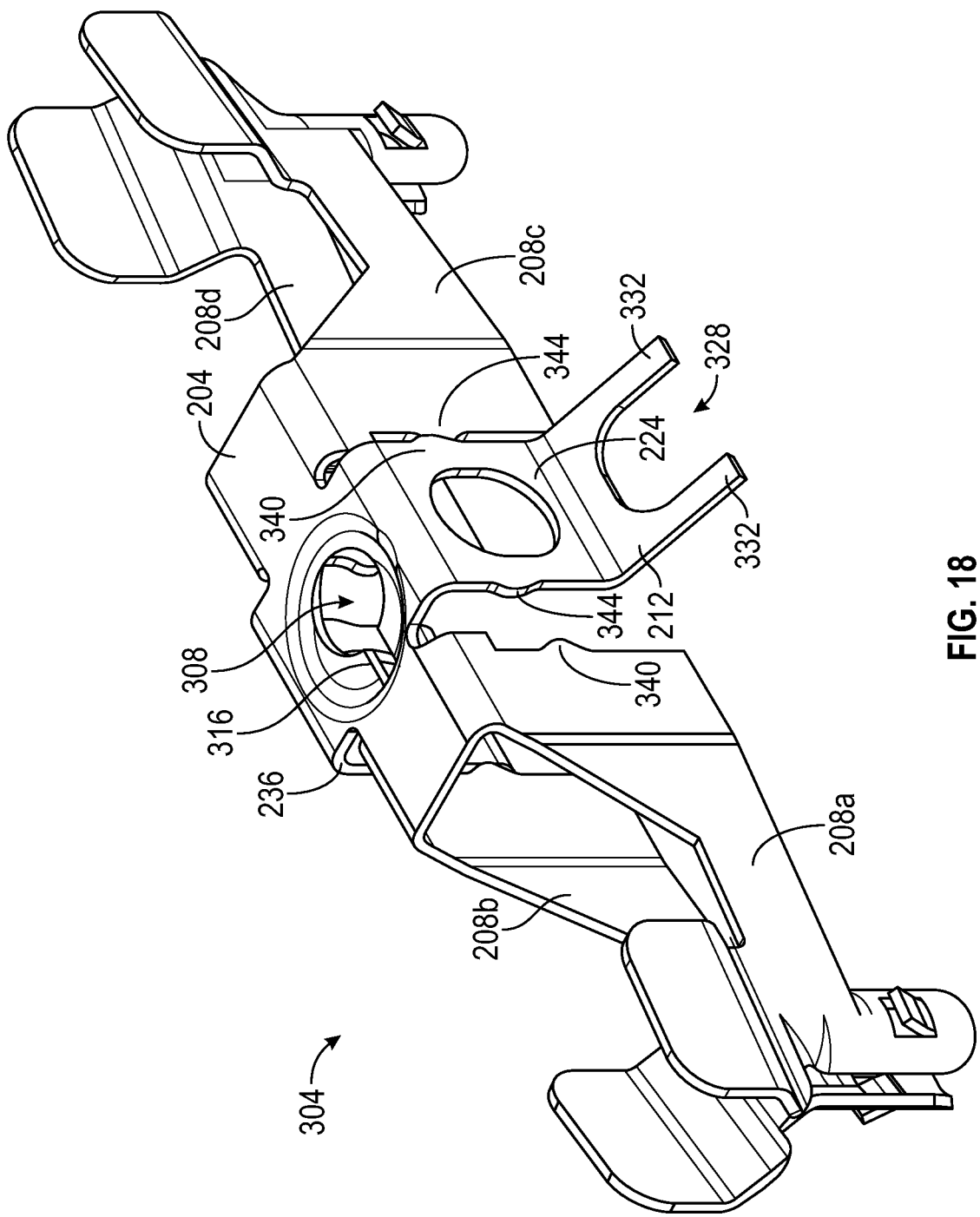
FIG. 18 is a top isometric view of a mounting bracket according to an embodiment of the invention.
Figure 19:
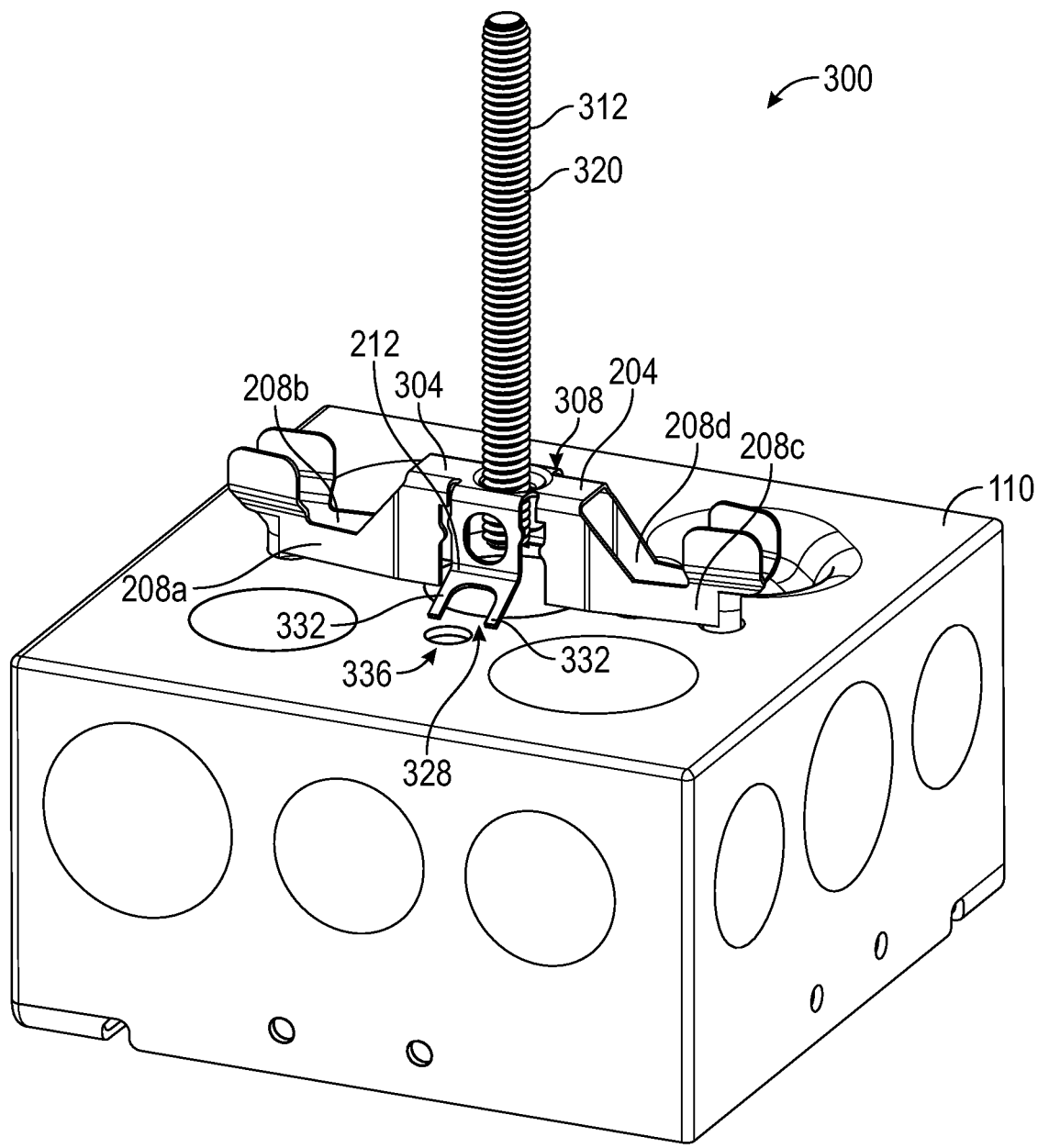
FIG. 19 is a top isometric view of the mounting bracket of FIG. 18 installed to secure an electrical box to a threaded rod.

More specifically, with reference to FIGS. 18 and 19 in particular, the bracket body 204 of the mounting bracket 304 includes a threaded mounting opening 308 that is configured to receive a threaded rod 312 (see FIG. 19) for mounting the mounting bracket 304 to another structure (not shown). Internal threads 316 (see FIG. 18) on the mounting opening 308 are configured to mate with external threads 320 on the threaded rod 312 to adjustably secure the mounting bracket to a structure, such as, e.g., a ceiling structure. Before or after being secured to a support structure (e.g., the rod 312), the mounting bracket 304 may be secured to the electrical box 110 similarly the mounting bracket 304 of FIGS. 1-17.

As another example, each of the support legs 212, 214 of the mounting bracket 304 includes a cut out 328, thereby defining a pair of contact legs 332 on each support leg 212, 214. In some cases, the contact legs 332 may provide reliable contact with electrical boxes having a variety of surface conditions, such as, e.g., warped or contoured surfaces, by providing separate, spaced-apart contact points. Further, the cut out 328 may be configured to accommodate fasteners or other components on an electrical box. For example, the cut outs 328 may align with openings 336 on the electrical box 110 to accommodate passage of wire, cables, fasteners, or the like.

Returning to FIG. 18, similar to the mounting bracket 304 of FIGS. 1-17, each spring arm 208a, 208b, 208c, 208d of the mounting bracket 304 includes a first protrusion 340 that extends from the respective spring arm 208a, 208b, 208c, 208d towards at least one of the first support leg 212 and the second support leg 214, adjacent to the first and third portions 224, 236 thereof. However, the mounting bracket 304 further includes a second protrusion 344 disposed on at least one of the support legs 212, 214 and opposing one of the first protrusions 340. More specifically, each of the first protrusions 340 is positioned such that it opposes one of the second protrusions 344 extending from at least one of the first support leg 212 and the second support leg 214.

Figure 20:
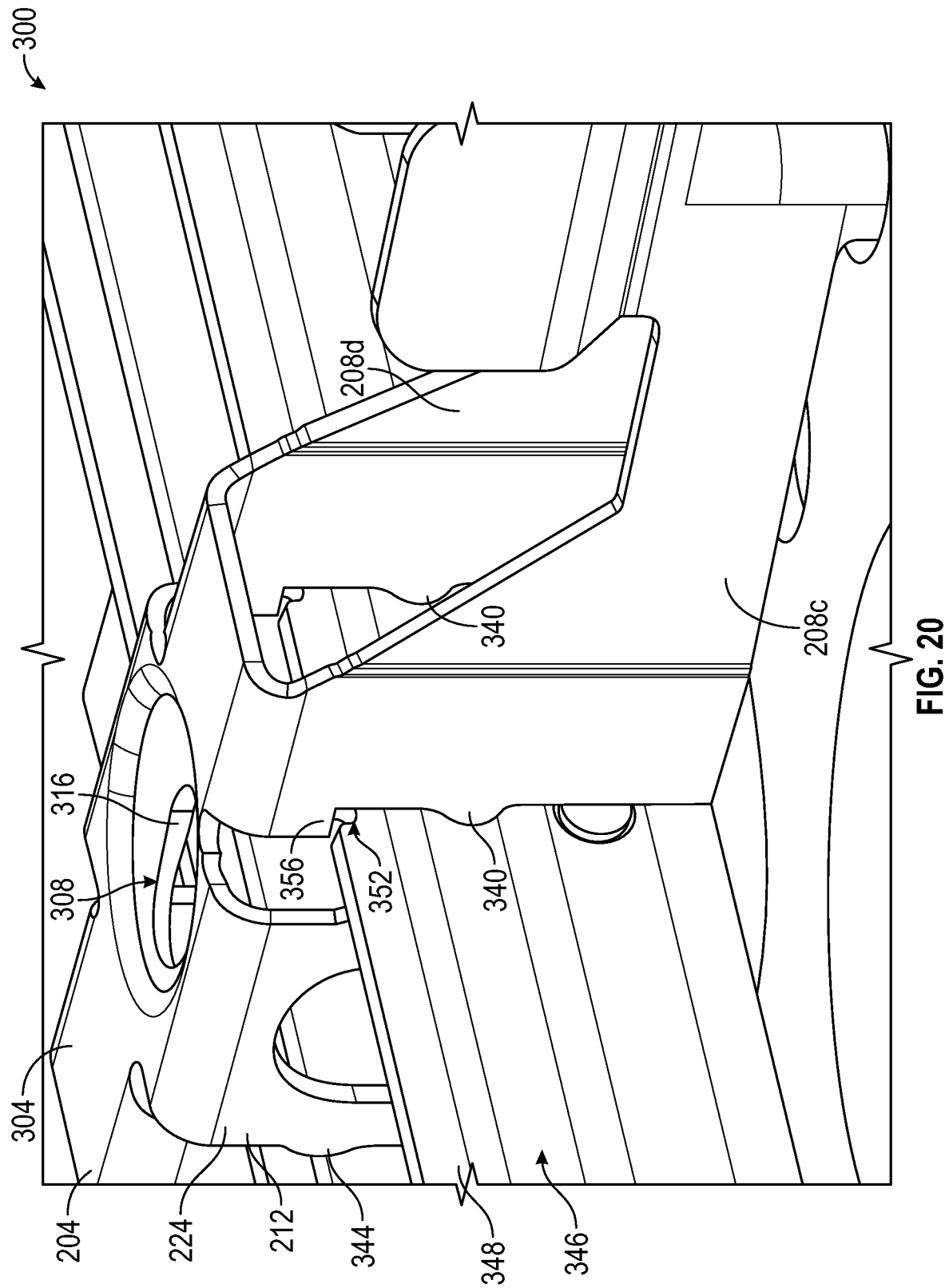
FIG. 20 is a top isometric partial view of the mounting bracket of FIG. 18 with a support bar.

Differently said, the first protrusions 340 extends from the spring arms 208a, 208b, 208c, 208d towards the second protrusions 344, which extend from the first portions 224 of the support legs 212, 214 towards the respective spring arm 208a, 208b, 208c, 208d. As illustrated in FIG. 20, the first protrusions 340 and the second protrusions 344 thus are configured to slide within and along, respectively, elongate grooves 346 of a support bar 348 on opposing sides of opposing legs of a channel of the support bar 348.

Figure 21:
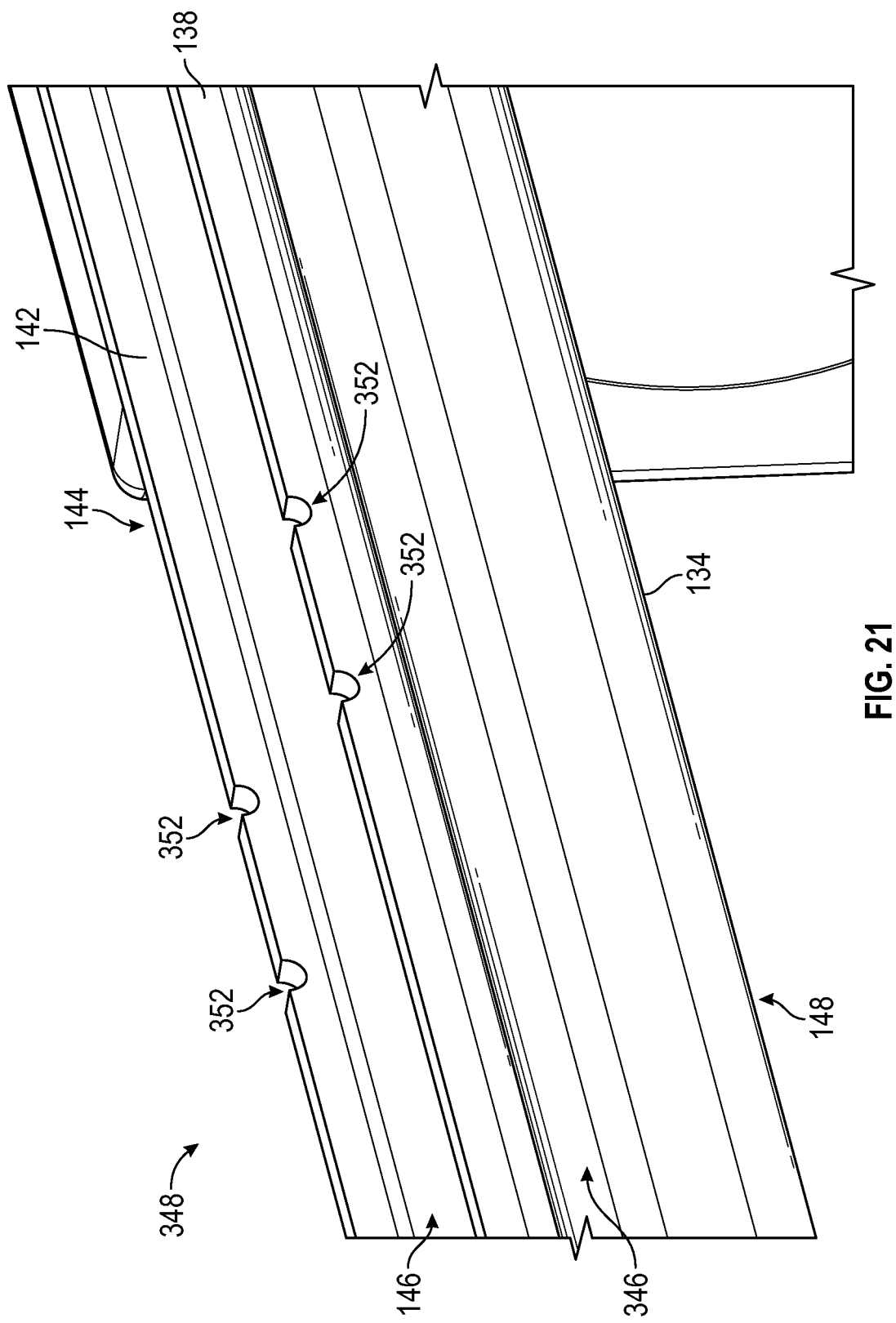
FIG. 21 is a top isometric partial view of the support bar of FIG. 20.
Figure 22:
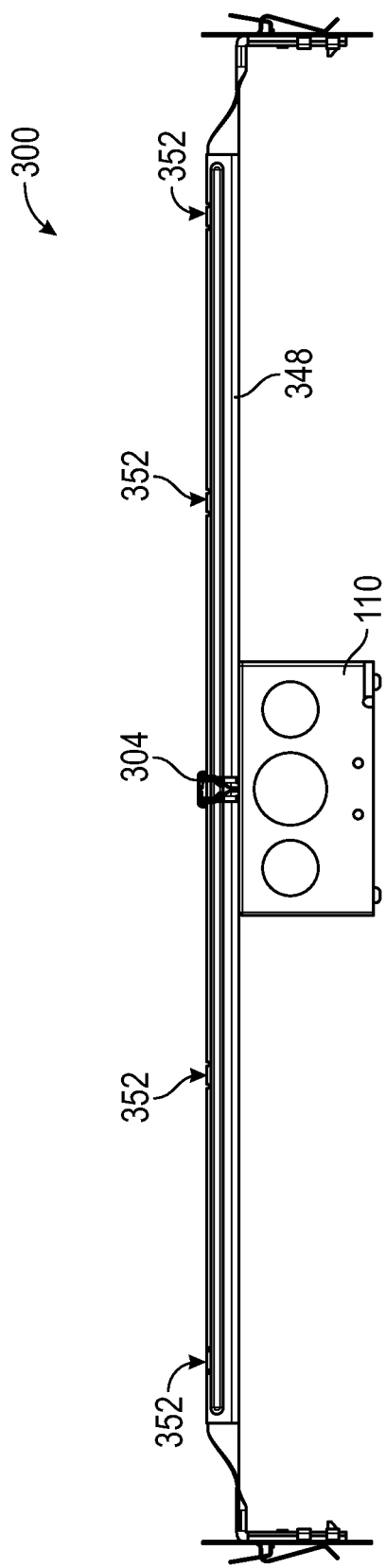
FIG. 22 is a front elevation view of a bracket system including the mounting bracket and support bar of FIG. 20 and an electrical box.

Turning to FIG. 21, some configurations the bracket system 300 includes the support bar 348. The support bar 348 is generally similar in design and functionality to the support bar 130 of FIGS. 1-17, with similar elements identified using like reference numerals, but differs in some aspects. For example, the support bar 348 includes a plurality of notches 352 disposed along a length thereof. In the illustrated embodiment, these notches 352 are provided on the first side 144 of the support bar 348 and are generally aligned to receive a portion of the mounting bracket 304 (see, e.g., FIG. 20) therein. More specifically, returning to FIG. 20, the spring arms 208a, 208b, 208c, 208d of the mounting bracket 304 each include a shoulder 356 configured to be received by at least one of the notches 352 on the support bar 348. Retaining at least one of the shoulder 356 within one of the notches 352 may restrict axial movement of the mounting bracket 304 along the support bar 348, thereby retaining the mounting bracket 304 in a particular position. Therefore, the notches 352 may be provided at positions along the support bar 348 at which an electrical box is commonly secured, such as, e.g., a central position as shown in FIG. 22. In other embodiments, similar features to engage notches or other similar contours on a support structure can be located on different parts of a mounting bracket, including on support legs or a main body of the mounting bracket rather than on spring arms of the mounting bracket.

Thus, embodiments of the invention can provide improved mounting devices for electrical boxes or other components. In some embodiments, for example, improved mounting brackets and related systems for electrical boxes may not need added hardware, such as fasteners, to secure electrical boxes in installed orientations. Therefore, installation and adjustments may be substantially simplified as compared to conventional designs.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A mounting bracket to secure an electrical box to a support bar or a threaded rod, the electrical box including a back wall with first and second mounting openings, the mounting bracket including:
    a body;
    a first spring arm and a second spring arm that extend integrally from the body, each of the first and second spring arms extending to a free end, the free ends of the first and second spring arms being spaced apart from each other by a first resting distance in a rest orientation and being sized to collectively extend into the first mounting opening of the electrical box, the first resting distance being larger than a width of the first mounting opening; and
    a third spring arm and a fourth spring arm that extend integrally from the body opposite the first and second spring arms, each of the third and fourth spring arms extending to a free end, the free ends of the third and fourth spring arms being spaced apart from each other by a second resting distance in a rest orientation and being sized to collectively extend into the second mounting opening of the electrical box, the second resting distance being larger than a width of the second mounting opening;
    the first and second spring arms and the third and fourth spring arms, respectively, being collectively and resiliently moveable relative to the body from the respective rest orientations to respective installation orientations and respective installed orientations;
    the free ends of the first and second spring arms being spaced apart from each other by a first installation distance in the installation orientation, and the free ends of the third and fourth spring arms being spaced apart from each other by a second installation distance in the installation orientation, the first and second installation distances being smaller, respectively, than the first and second resting distances and smaller, respectively, than the widths of the first and second mounting openings; and
    the free ends of the first and second spring arms being spaced apart from each other by a first installed distance in the installed orientation, and the free ends of the third and fourth spring arms being spaced apart from each other by a second installed distance in the installed orientation, the first and second installed distances being larger, respectively, than the first and second installation distances and smaller, respectively, than the first and second resting distances.

2. The mounting bracket of claim 1 further comprising a first support leg that extends integrally from the body, the first support leg angling obliquely relative to the body at a first angle in a rest configuration;
    wherein the free ends of the first, second, third and fourth spring arms define an insertion direction relative to the first and second mounting openings; and
    wherein the first support leg is configured to resiliently flex between the rest configuration and an installed configuration, via contact with the support bar, to urge the mounting bracket in a direction opposite the insertion direction.

3. The mounting bracket of claim 1, wherein the body is configured to:
    resiliently flex along an axis that extends between the first and second spring arms as the first and second spring arms are moved from the rest orientation to the installation orientation;
    resiliently flex along an axis that extends between the third and fourth spring arms as the third and fourth spring arms are moved from the rest orientation to the installed orientation;
    resiliently urge the first and second spring arms apart when the first and second spring arms are in the installation and installed orientations; and
    resiliently urge the third and fourth spring arms apart when the third and fourth spring arms are in the installation and installed orientations.

4. The mounting bracket of claim 1, with the support bar including an elongate channel that includes a base and two legs, at least one leg of the elongate channel including an elongate groove,
   wherein a protrusion is included on at least one of the first spring arm, the second spring arm, the third spring arm, the fourth spring arm, or a support leg that is configured to extend into the elongate channel of the support bar, the protrusion being configured to engage the elongate channel when the mounting bracket is installed on the support bar, to secure the mounting bracket to the support bar and guide sliding adjustment of the mounting bracket along the support bar.

5. The mounting bracket of claim 1, wherein each of the free ends of at least two of the first, second, third, and fourth spring arm has a rounded profile.

6. The mounting bracket of claim 5, wherein at least one of:
   the rounded profiles of the free ends of the first and second spring arms are configured to partly nest with each other when the first and second spring arms are in the installation orientation, or
   the rounded profiles of the free ends of the third and fourth spring arms are configured to partly nest within each other when the third and fourth spring arms are in the installation orientation.

7. The mounting bracket of claim 6, wherein at least one of:
   the rounded profiles of the free ends of the first and second spring arms exhibit opposing curvature relative to each other, or
   the rounded profiles of the free ends of the third and fourth spring arms exhibit opposing curvature relative to each other.

8. The mounting bracket of claim 1, wherein each of the free ends of the first, second, third, and fourth spring arms supports an engagement tab configured for manual engagement to flex the spring arms between the rest and installation orientations.

9. A bracket system for securing an electrical box to a ceiling structure, the electrical box including a back wall with a first mounting opening, the bracket system comprising:
   an integrally formed mounting bracket that includes:
      a body; and
      a first spring arm and a second spring arm, each extending from the body and including a locking profile and an engagement feature;
   the first and second spring arms being configured to:
      be moved towards each other by simultaneous manual engagement of the engagement features, to align the locking profiles for insertion from a back side of the back wall of the electrical box into the first mounting opening of the electrical box; and
      spring resiliently apart from each other, upon release of the engagement features with the locking profiles inserted into the first mounting opening, to secure the locking profiles against removal from the first mounting opening.

10. The bracket system of claim 9 further comprising:
   a support bar with an elongate channel that includes a base and two legs and defines an elongate direction;
   wherein the mounting bracket is removably securable to the support bar and further comprises at least one support leg that extends from the body and is configured to resiliently bear against one or more inner surfaces of the elongate channel of the support bar, when the locking profiles are secured against removal from the first mounting opening of the electrical box, to urge the back wall of the electrical box, via the first and second spring arms, towards the support bar.

11. The bracket system of claim 10, wherein the mounting bracket is symmetric about an axis that extends perpendicularly with the elongate direction of the elongate channel of the support bar and includes two support legs, each configured to resiliently bear against the one or more inner surfaces of the elongate channel of the support bar, when the locking profiles are secured against removal from the first mounting opening of the electrical box, to urge the back wall of the box towards the support bar.

12. The bracket system of claim 10, wherein the body is configured to seat on a first surface of a support bar with the first and second spring arms securing the electrical box against a second surface of the support bar.

13. The bracket system of claim 12, wherein the mounting bracket is symmetric about an axis that extends in parallel with the elongate direction of the elongate channel of the support bar and is configured to simultaneously engage the first mounting opening of the electrical box and a second mounting opening of the electrical box, opposite the support bar from the first mounting opening, to secure the electrical box to the support bar.

14. The bracket system of claim 10, wherein at least one of the two legs of the support bar includes a groove; and
   wherein each of the first and second spring arms includes a protrusion that engages the groove to removably secure the mounting bracket to the support bar.

15. The bracket system of claim 9, for use with a support bar having an elongate channel, wherein the body is configured to:
   flex along an axis that extends perpendicularly with a longitudinal axis of the elongate channel of the support bar when the engagement features are engaged to move the first and second spring arms towards each other; and
   resiliently unflex, upon release of the engagement features, to urge the locking profiles into engagement with opposing sides of the first mounting opening.

16. The bracket system of claim 9, wherein each of the locking profiles includes a rounded free end and a locking tab that angles away from the rounded free end, the locking tab being configured to extend towards an inside of the back wall of the electrical box when the locking profile is inserted into the first mounting opening of the back wall.

17. A method of installing an electrical box on a support bar or a threaded rod, the method comprising:
   engaging a mounting bracket with the support bar or the threaded rod;
   manually squeezing first and second spring arms of the mounting bracket together to insert free ends of the first and second spring arms into a first mounting opening of the electrical box;
   manually releasing the first and second spring arms so that the first and second spring arms resiliently move apart from each other with the free ends within the first mounting opening, to secure the electrical box to the mounting bracket at the first mounting opening;
   manually squeezing third and fourth spring arms of the mounting bracket together to insert free ends of the third and fourth spring arms into a second mounting opening of the electrical box; and
   manually releasing the third and fourth spring arms so that the third and fourth spring arms resiliently move apart from each other with the free ends within the second mounting opening, to secure the electrical box to the mounting bracket at the second mounting opening.

18. The method of claim 17, wherein engaging the mounting bracket with the support bar includes engaging one or more support legs of the mounting bracket with the support bar on an opposite side of the support bar from the electrical box;
- wherein urging the electrical box towards the support bar resiliently flexes the one or more support legs against the support bar; and
- wherein, when the first, second, third, and fourth spring arms secure the electrical box to the mounting bracket at the first and second mounting openings, the one or more support legs resiliently urge the electrical box, via the first, second, third and fourth spring arms, towards the support bar.

19. The method of claim 17, wherein the mounting bracket is engaged with the support bar from a first side of the support bar, and the electrical box is secured to the mounting bracket on a second side of the support bar opposite the first side.

20. The method of claim 17, further comprising:
- before securing the electrical box to the mounting bracket at the first or second mounting opening, removably securing the mounting bracket to the support bar for sliding adjustment along an elongate channel of the support bar.

\* \* \* \* \*